(12) United States Patent
Tashiro et al.

(10) Patent No.: US 9,081,240 B2
(45) Date of Patent: Jul. 14, 2015

(54) LIQUID CRYSTAL DISPLAY DEVICE

(75) Inventors: Kunihiro Tashiro, Osaka (JP); Hideki Fujimoto, Osaka (JP); Yoshihito Hara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 240 days.

(21) Appl. No.: 13/699,122

(22) PCT Filed: May 19, 2011

(86) PCT No.: PCT/JP2011/061483
§ 371 (c)(1),
(2), (4) Date: Nov. 20, 2012

(87) PCT Pub. No.: WO2011/145672
PCT Pub. Date: Nov. 24, 2011

(65) Prior Publication Data
US 2013/0063686 A1    Mar. 14, 2013

(30) Foreign Application Priority Data

May 20, 2010 (JP) .................................. 2010-116687

(51) Int. Cl.
*G02F 1/1343* (2006.01)
*G02F 1/1337* (2006.01)

(52) U.S. Cl.
CPC .... *G02F 1/134336* (2013.01); *G02F 1/133707* (2013.01); *G02F 1/133753* (2013.01); *G02F 2001/133757* (2013.01); *G02F 2001/134318* (2013.01)

(58) Field of Classification Search
CPC .............. G02F 1/133707; G02F 2001/134345
USPC .................................................. 349/130, 144
See application file for complete search history.

(56) References Cited

U.S. PATENT DOCUMENTS 5,808,705 A * 9/1998 Hishida et al. ................. 349/33
6,177,968 B1 * 1/2001 Okada et al. .................... 349/38
(Continued)

FOREIGN PATENT DOCUMENTS

| JP | 11-242225 | 9/1999 |
|---|---|---|
| JP | 2002-202511 | 7/2002 |

(Continued)

OTHER PUBLICATIONS

English Translation of International Preliminary Report on Patentability and Written Opinion issued in Application Serial No. PCT/JP2011/061483 issued Dec. 4, 2012.
(Continued)

*Primary Examiner* — Hoan C Nguyen
(74) *Attorney, Agent, or Firm* — Nixon & Vanderhye P.C.

(57) ABSTRACT

A liquid crystal display device (100) of the present invention has a plurality of pixels (P) which are in a matrix arrangement and includes: a first substrate (1) which includes a pixel electrode (12) which is provided in each pixel; a second substrate (2) which opposes the first substrate; and a vertical alignment liquid crystal layer (3) which is provided between these substrates, wherein light that is incident on the liquid crystal layer is circularly-polarized light, and the liquid crystal layer modulates the circularly-polarized light, thereby realizing display. The pixel electrode includes at least one cruciform trunk portion (12a), a plurality of branch portions (12b) extending from the at least one cruciform trunk portion in a direction of about 45°, and a plurality of slits (12c) provided between the plurality of branch portions. The second substrate includes a plurality of counter electrodes (22) which are electrically independent of each other in each pixel. According to the present invention, in a liquid crystal display device which includes a vertical alignment liquid crystal, the γ shift can be sufficiently reduced, and decrease of the transmittance can be prevented.

5 Claims, 13 Drawing Sheets

(56) References Cited

U.S. PATENT DOCUMENTS

| | | |
|---|---|---|
| 6,661,488 B1 | 12/2003 | Sasabayashi et al. |
| 6,952,252 B2 | 10/2005 | Nakanishi |
| 6,958,791 B2 | 10/2005 | Shimshikiryo |
| 7,034,789 B2 | 4/2006 | Takeuchi et al. |
| 7,113,241 B2 | 9/2006 | Hanaoka |
| 7,215,395 B2 | 5/2007 | Kubo et al. |
| 7,230,664 B2 | 6/2007 | Kubo et al. |
| 7,656,474 B2 | 2/2010 | Hanaoka et al. |
| 7,710,523 B2 | 5/2010 | Nakanishi et al. |
| 8,432,518 B2 * | 4/2013 | Nakanishi et al. ............ 349/129 |
| 2003/0071952 A1 | 4/2003 | Yoshida et al. |
| 2006/0055858 A1 | 3/2006 | Nakanishi et al. |
| 2007/0159585 A1 * | 7/2007 | Yoshida et al. ............... 349/130 |
| 2008/0007679 A1 * | 1/2008 | Ochiai et al. ................. 349/114 |
| 2010/0053528 A1 * | 3/2010 | Li et al. ........................ 349/124 |
| 2010/0157186 A1 * | 6/2010 | Kim et al. ....................... 349/39 |
| 2010/0253897 A1 * | 10/2010 | Ohgami et al. ............... 349/142 |
| 2011/0193769 A1 | 8/2011 | Ohgami et al. |

FOREIGN PATENT DOCUMENTS

| | | |
|---|---|---|
| JP | 2003-043525 | 2/2003 |
| JP | 2003-149647 | 5/2003 |
| JP | 2003-177418 | 6/2003 |
| JP | 2003-186017 | 7/2003 |
| JP | 2003-287753 | 10/2003 |
| JP | 2004-062146 | 2/2004 |
| JP | 2004-078157 | 3/2004 |
| JP | 2006-078968 | 3/2006 |
| JP | 2006-189610 | 7/2006 |
| JP | 2006-330638 | 12/2006 |
| JP | 2007-272226 | 10/2007 |
| WO | WO 2010/041418 | 4/2010 |
| WO | WO 2010/041418 A1 | 4/2010 |

OTHER PUBLICATIONS

International Search Report for PCT/JP2011/061483, mailed Jul. 12, 2011.

* cited by examiner

FIG. 1
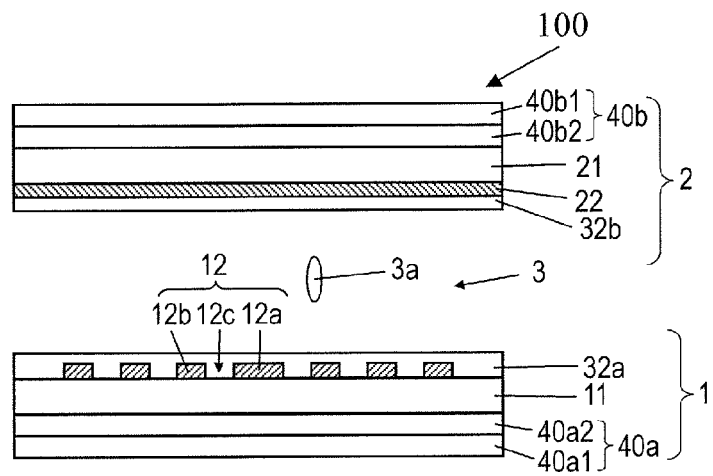
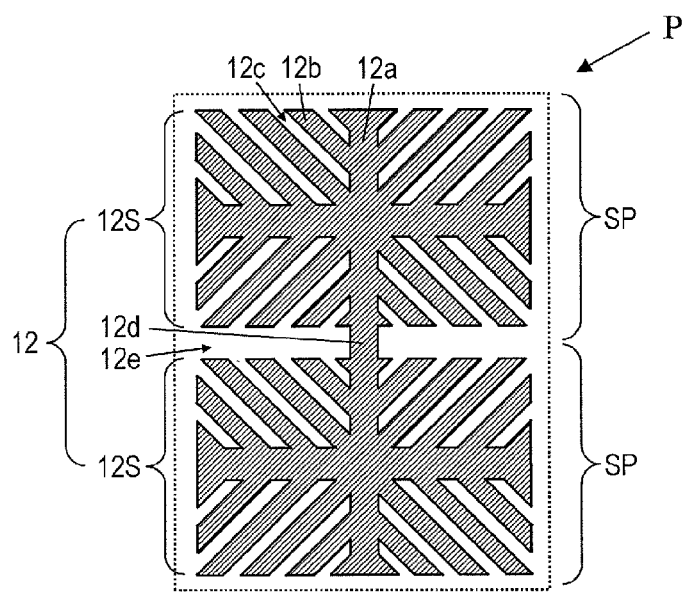
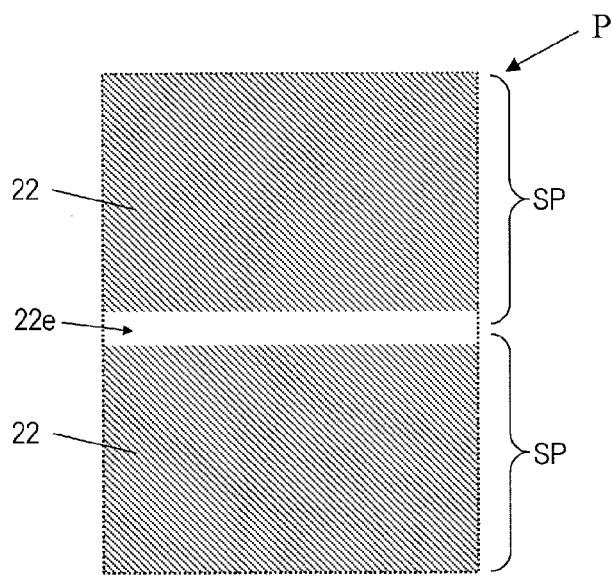

FIG.9
(a)
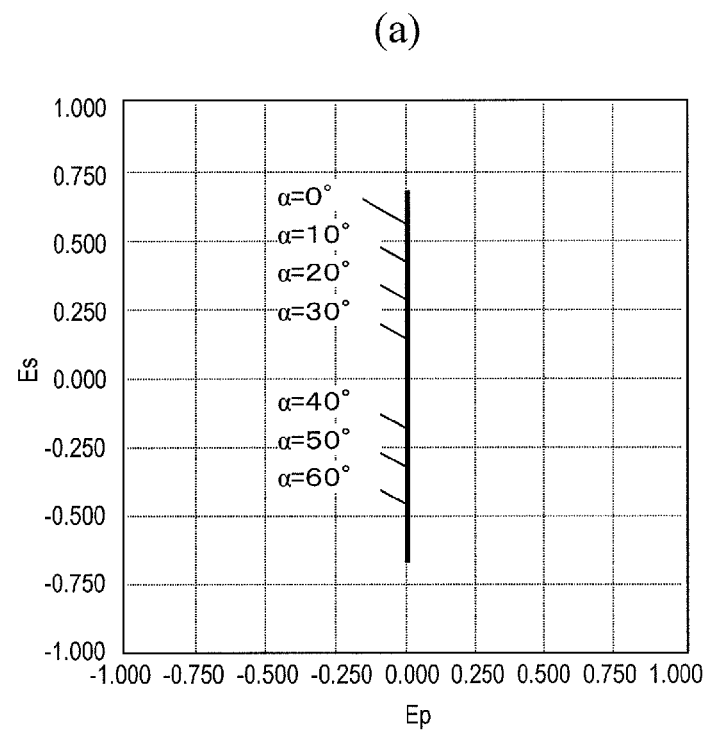
(b)
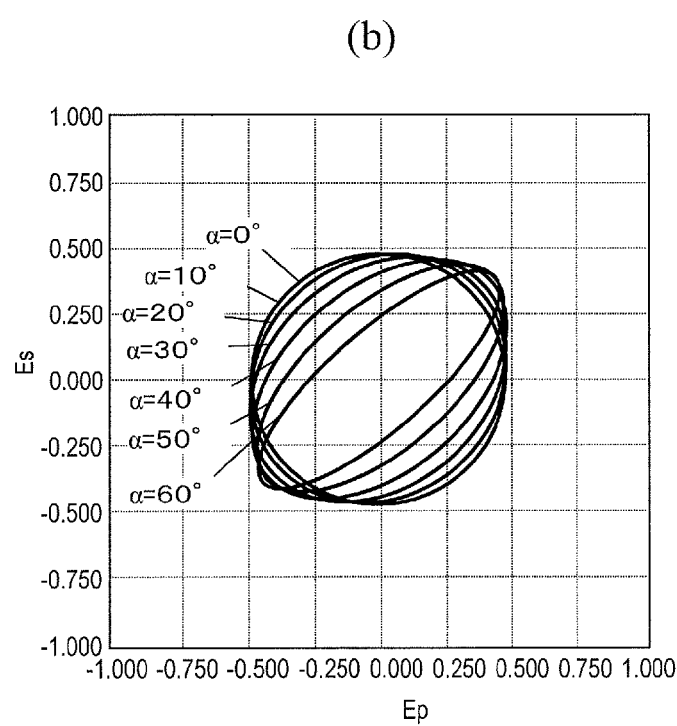

*FIG.10*
(a)
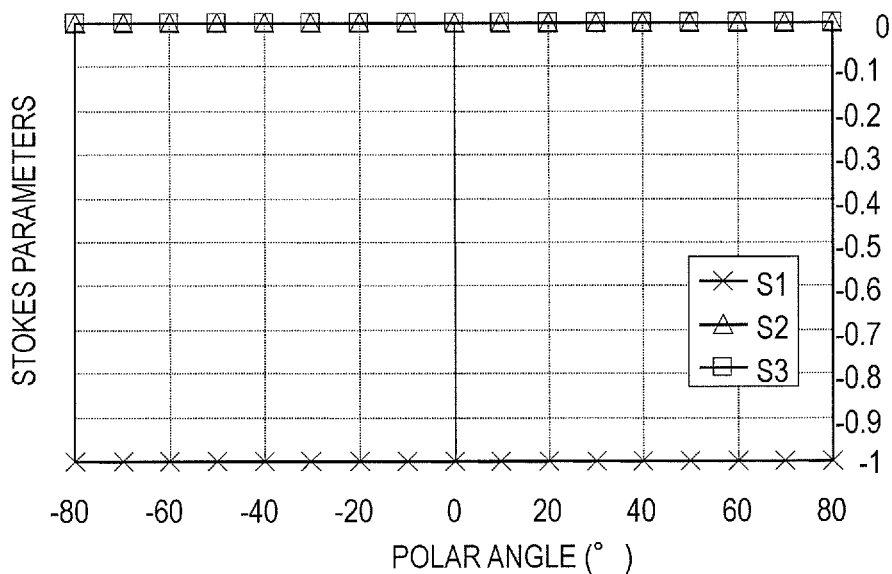
(b)
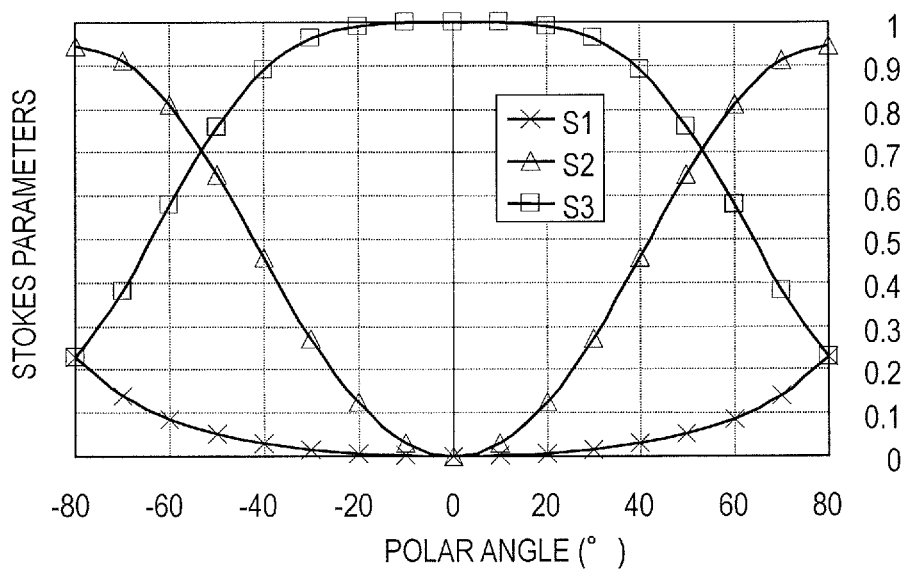

(a) TYPE 1    (b) TYPE 2    (c) TYPE 3    (d) TYPE 4

(a) TYPE 5    (b) TYPE 6    (c) TYPE 7    (d) TYPE 8

*FIG.17*
(a)
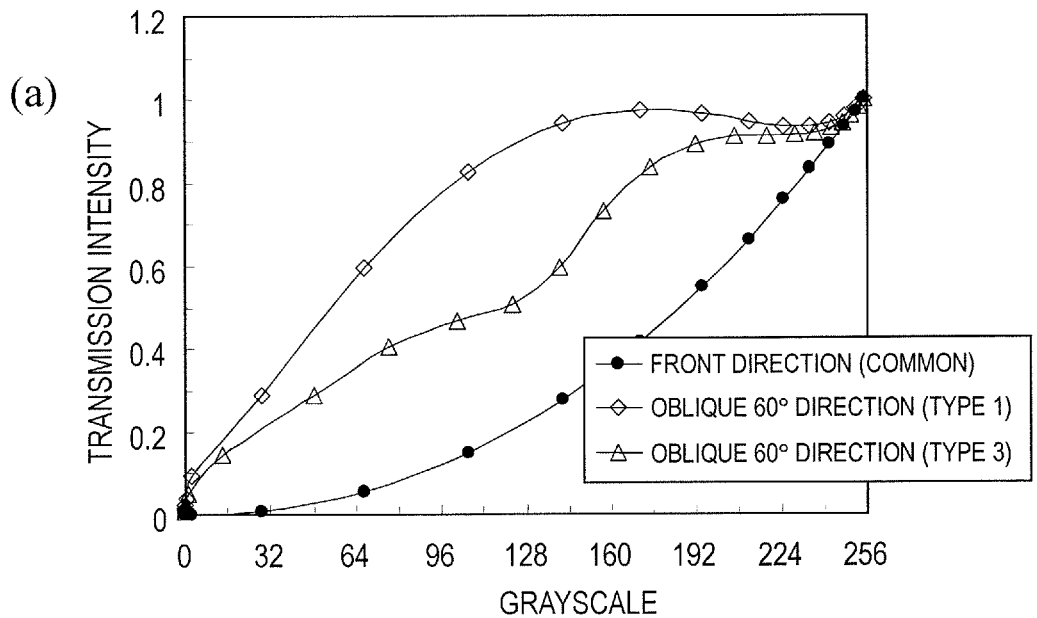
(b)
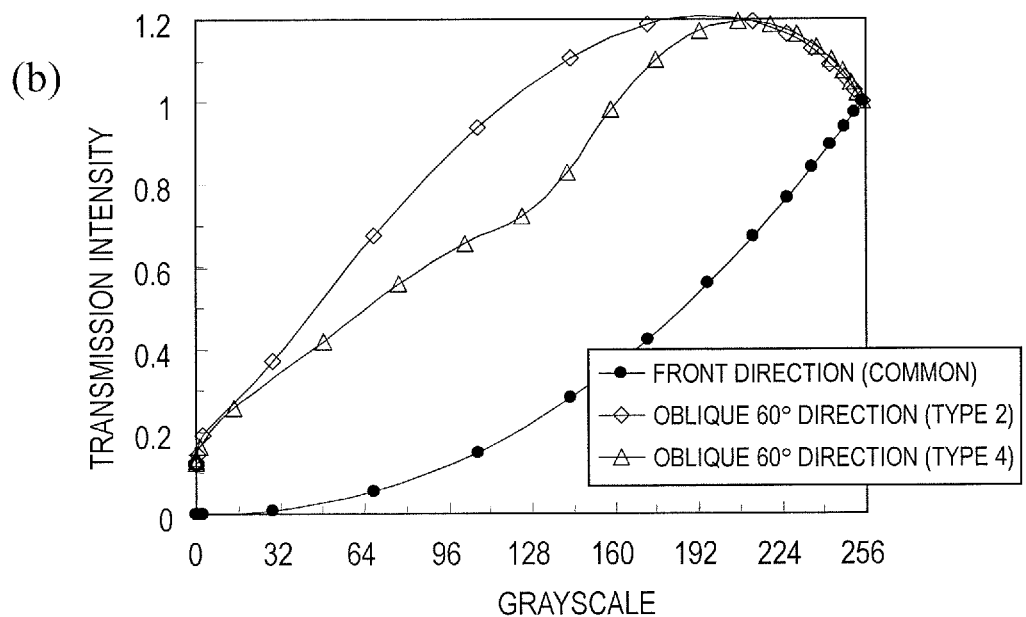

LIQUID CRYSTAL DISPLAY DEVICE

This application is the U.S. national phase of International Application No. PCT/JP2011/061483, filed 19 May 2011, which designated the U.S. and claims priority to JP Patent Application No. 2010-116687, filed 20 May 2010, the entire contents of each of which are hereby incorporated by reference.

TECHNICAL FIELD

The present invention relates to a liquid crystal display device.

BACKGROUND ART

In recent years, by the utilization of their outstanding features such as slim body and low power consumption, liquid crystal display devices have been widely applied to various devices including information devices, such as notebook personal computers, mobile phones, electronic organizers, etc., and camcorders which have a liquid crystal monitor. The VA (Vertical Alignment) mode has been proposed as a display mode which is capable of realizing a higher contrast and a wider viewing angle in the liquid crystal display devices. The VA mode has been employed in many liquid crystal display devices nowadays. The VA mode liquid crystal display devices include a vertical alignment liquid crystal layer in which liquid crystal molecules are oriented generally vertical to the substrate surface in the absence of an applied voltage.

A known one of the VA mode is MVA (Multi-domain Vertical Alignment) mode (for example, Patent Document 1). In the MVA mode, a pair of substrates which oppose each other via a liquid crystal layer are each provided with an alignment controlling structure which is configured to control the alignment of the liquid crystal molecules. The alignment controlling structure is, specifically, a protrusion which is made of a dielectric substance or a slit which is formed in an electrode. When the alignment controlling structure such as a protrusion or a slit is provided, a plurality of regions among which the azimuth of inclination of the liquid crystal molecules is different (referred to as "liquid crystal domains") are formed in the presence of an applied voltage across the liquid crystal layer. Therefore, the azimuthal angle dependence of the display characteristics is ameliorated, and the viewing angle characteristics are improved.

Although, in the VA mode liquid crystal display devices, display of wide viewing angles and high quality is realized as described above, there is a problem about the viewing angle characteristics which has been recently growing. Specifically, the problem is the difference between the γ characteristic that is obtained when viewed from the front and the γ characteristic that is obtained when obliquely viewed, i.e., the viewing angle dependence of the γ characteristic. The γ characteristic refers to the grayscale dependence of the display luminance. When the γ characteristic is different between the front viewing direction and the oblique viewing direction, the grayscale display state varies according to the viewing direction, resulting in display with a sense of incongruity.

The viewing angle dependence of the γ characteristic in the VA mode (which is also referred to as "γ shift") is perceived as such a phenomenon that the display luminance which is detected when obliquely viewed is higher than the display luminance which is supposed to be detected (which is called a "whitening" phenomenon). If the whitening phenomenon occurs, such a problem also occurs that the color which is rendered by a pixel when viewed from an oblique direction is different from the color which is rendered by the pixel when viewed from the front direction.

As the technique for reduction of the γ shift (whitening phenomenon), a technique called "multi-pixel driving" has been proposed (for example, Patent Documents 2 and 3). According to this technique, one pixel is divided into a plurality of sub-pixels (typically, two sub-pixels) which provide different luminances. Specifically, one pixel electrode is divided into a plurality of sub-pixel electrodes (typically, two sub-pixel electrodes) which are electrically independent of each other. Potentials which are different from each other are applied to the respective sub-pixel electrodes such that the effective voltages that are applied across the liquid crystal layers of the respective sub-pixels can be different from each other.

For example, a plurality of TFTs which are coupled to different signal lines are provided in each pixel, and respective ones of the plurality of sub-pixel electrodes are coupled to respective ones of the plurality of TFTs. This arrangement enables supply of different signal voltages (grayscale voltages) to the respective sub-pixel electrodes. Alternatively, the storage capacitance counter electrodes that form the storage capacitances in respective sub-pixels are configured to be electrically independent, and different CS voltages are supplied from storage capacitance lines to the respective storage capacitance counter electrodes. This arrangement enables supply of different potentials to the respective sub-pixel electrodes by means of division of capacitance. When each pixel is divided into a plurality of sub-pixels which provide different luminances, the display is observed in which different γ characteristics are in a mixed state, so that the γ shift is reduced.

Another one of the VA mode which is widely known is CPA (Continuous Pinwheel Alignment) mode (for example, Patent Documents 4 and 5). In the CPA mode, an opening or notch is formed in the pixel electrode such that the pixel electrode is divided into a plurality of regions (which are referred to as "unit solid portions"). An oblique electric field produced at the edge of the opening or notch is used to realize a radial inclination alignment (axially-symmetric alignment) of the liquid crystal molecules, whereby a wide viewing angle is achieved. Also, a protrusion or opening is formed in the counter electrode such that the center axis of the liquid crystal domains that are in the radial inclination alignment is fixed, whereby the stability of the radial inclination alignment is further improved.

When a configuration which utilizes linearly-polarized light, i.e., a configuration where display is realized by allowing linearly-polarized light to enter the liquid crystal layer such that the linearly-polarized light is modulated, is employed in the CPA mode, the transmittance decreases. This is because, in the CPA mode, the liquid crystal molecules are oriented in substantially all azimuths in the presence of an applied voltage, and therefore, liquid crystal molecules which are oriented in an azimuth generally parallel to or an azimuth generally perpendicular to the polarization direction of linearly-polarized light that enters the liquid crystal layer do not contribute to the transmittance.

On the other hand, when a configuration which utilizes circularly-polarized light, i.e., a configuration where display is realized by allowing circularly-polarized light to enter the liquid crystal layer such that the circularly-polarized light is modulated, is employed in the CPA mode, all of liquid crystal molecules which are inclined in the presence of an applied voltage contribute to the transmittance. Therefore, the decrease of the transmittance can be prevented, and bright display can be realized.

CITATION LIST

Patent Literature

Patent Document 1: Japanese Laid-Open Patent Publication No. 11-242225
Patent Document 2: Japanese Laid-Open Patent Publication No. 2004-62146
Patent Document 3: Japanese Laid-Open Patent Publication No. 2004-78157
Patent Document 4: Japanese Laid-Open Patent Publication No. 2003-43525
Patent Document 5: Japanese Laid-Open Patent Publication No. 2002-202511
Patent Document 6: Japanese Laid-Open Patent Publication No. 2006-189610

SUMMARY OF INVENTION

Technical Problem

However, in the CPA mode which utilizes circularly-polarized light, the γ shift (whitening phenomenon) is larger than in the MVA mode as will be described later, although the transmittance is high. The γ shift can be reduced by using the multi-pixel driving technique. In that case, however, it is necessary to provide a plurality of TFTs in each pixel, and thus, the aperture ratio decreases, and the transmittance decreases. Patent Document 6 discloses a configuration which realizes multi-pixel driving with only one TFT provided in each pixel. This is realized by directly coupling part of a plurality of sub-pixel electrodes to the TFT while the remaining sub-pixel electrodes are coupled to the TFT via capacitance coupling. Employing this configuration causes such a new problem that a charge accumulation (image sticking) occurs due to a floating structure. Further, it was found through the researches conducted by the inventors of the present application that the γ shift is inherently large in the CPA mode, and therefore, it is difficult to sufficiently reduce the γ shift even when the multi-pixel driving technique is employed.

The present invention was conceived in view of the above problems. One of the objects of the present invention is to sufficiently reduce the γ shift and prevent decrease of the transmittance in a liquid crystal display device which includes a vertical alignment liquid crystal.

Solution to Problem

A liquid crystal display device of the present invention has a plurality of pixels which are in a matrix arrangement and includes: a first substrate which includes a pixel electrode which is provided in each of the plurality of pixels; a second substrate which opposes the first substrate; and a vertical alignment liquid crystal layer which is provided between the first substrate and the second substrate, wherein light that is incident on the liquid crystal layer is circularly-polarized light, and the liquid crystal layer modulates the circularly-polarized light, thereby realizing display, the pixel electrode includes at least one cruciform trunk portion, a plurality of branch portions extending from the at least one cruciform trunk portion in a direction of about 45°, and a plurality of slits provided between the plurality of branch portions, and the second substrate includes a plurality of counter electrodes which are electrically independent of each other in each of the plurality of pixels.

In a preferred embodiment, when at least part of middle grayscale levels are displayed, the plurality of counter electrodes are supplied with different potentials.

In a preferred embodiment, when a voltage is applied across the liquid crystal layer, four types of liquid crystal domains are formed in the liquid crystal layer in each of the plurality of pixels, azimuths of four directors that are representative of orientations of liquid crystal molecules that are included in respective ones of the four types of liquid crystal domains are different from one another, and each of the azimuths of the four directors is generally parallel to any of the plurality of branch portions.

In a preferred embodiment, the four types of liquid crystal domains include a first liquid crystal domain in which the azimuth of the director is a first azimuth, a second liquid crystal domain in which the azimuth of the director is a second azimuth, a third liquid crystal domain in which the azimuth of the director is a third azimuth, and a fourth liquid crystal domain in which the azimuth of the director is a fourth azimuth, and a difference between any two of the first azimuth, the second azimuth, the third azimuth, and the fourth azimuth is generally equal to an integral multiple of 90°, and azimuths of directors of liquid crystal domains which are adjacent to each other via the trunk portion are different by about 90°.

In a preferred embodiment, the at least one cruciform trunk portion includes a plurality of cruciform trunk portions, the pixel electrode includes a plurality of sub-pixel electrodes each of which includes any one of the plurality of cruciform trunk portions, and when a voltage is applied across the liquid crystal layer, the four types of liquid crystal domains are formed in each of a plurality of sub-pixels which are defined by the plurality of sub-pixel electrodes.

In a preferred embodiment, the plurality of sub-pixel electrodes are provided so as to correspond to the plurality of counter electrodes on a one-to-one basis, and a boundary of adjacent sub-pixel electrodes overlaps a boundary of adjacent counter electrodes.

In a preferred embodiment, the liquid crystal display device of the present invention further includes: a pair of vertical alignment films which are provided between the pixel electrode and the liquid crystal layer and between the plurality of counter electrodes and the liquid crystal layer; and a pair of alignment sustaining layers which are provided on surfaces of the pair of vertical alignment films which are closer to the liquid crystal layer and which are made of a photopolymerized material.

In a preferred embodiment, the liquid crystal display device of the present invention further includes a pair of circular polarization plates which oppose each other via the liquid crystal layer.

Advantageous Effects of Invention

According to the present invention, in a liquid crystal display device which includes a vertical alignment liquid crystal, the γ shift can be sufficiently reduced, and decrease of the transmittance can be prevented.

BRIEF DESCRIPTION OF DRAWINGS

FIG. 1 Diagrams schematically showing a liquid crystal display device 100 of a preferred embodiment of the present invention. (a) is a cross-sectional view which shows a region corresponding to one pixel P. (b) is a plan view which shows an electrode structure on the TFT substrate 1 side. (c) is a plan view which shows an electrode structure on the counter substrate 2 side.

FIG. 9 Diagrams showing the polarization state (the locus of the tip of the electric field vector) of light that is incident on a liquid crystal layer 3. (a) is a diagram for a case where linearly-polarized light is utilized (the configuration shown in FIG. 7(*a*)). (b) is a diagram for a case where circularly-polarized light is utilized (the configuration shown in FIG. 7(*b*)).

FIG. 10 Graphs showing the polarization state of light that is incident on the liquid crystal layer 3 which is in a numerical expression with the ratio of S1 (horizontal polarization component), S2 (45° linear polarization component), and S3 (circular polarization component). (a) is a graph for a case where linearly-polarized light is utilized (the configuration shown in FIG. 7(*a*)). (b) is a graph for a case where circularly-polarized light is utilized (the configuration shown in FIG. 7(*b*)).

FIG. 17 Graphs showing the γ characteristic which is achieved when observed from the front viewing direction and the γ characteristic which is achieved when observed from a diagonal 60° direction in the type 1 to type 4 liquid crystal display devices which perform display in the CPA mode. (a) shows the γ characteristics of the type 1 and type 3 liquid crystal display devices which utilize linearly-polarized light. (b) shows the γ characteristics of the type 2 and type 4 liquid crystal display devices which utilize circularly-polarized light.

DESCRIPTION OF EMBODIMENTS

Figure 2:
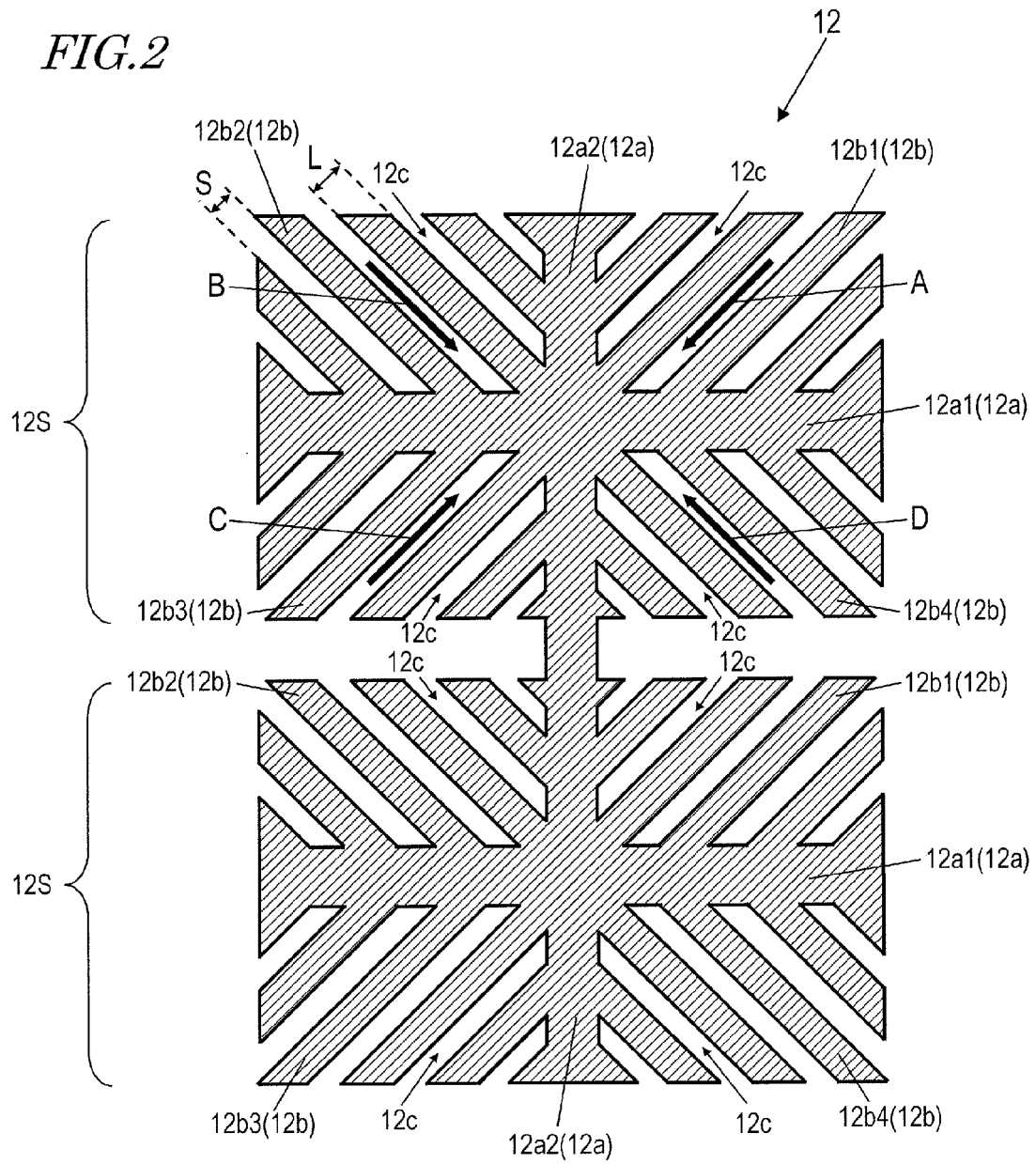
FIG. 2 A plan view schematically showing a pixel electrode 12 of the liquid crystal display device 100.

Hereinafter, an embodiment of the present invention will be described with reference to the drawings. Note that the present invention is not limited to the embodiment which will be described below.

First, a configuration of a liquid crystal display device 100 of the present embodiment is described with reference to FIGS. 1(*a*), 1(*b*), and 1(*c*). The liquid crystal display device 100 includes a plurality of pixels P which are in a matrix arrangement. FIG. 1(*a*) is a cross-sectional view which schematically shows a region corresponding to one pixel P of the liquid crystal display device 100. FIG. 1(*b*) and FIG. 1(*c*) schematically show electrode structures in one pixel P. FIG. 1(*b*) shows the electrode structure which is on the side of one of a pair of substrates of the liquid crystal display device 100. FIG. 1(*c*) shows the electrode structure on the other substrate side.

The liquid crystal display device 100 includes, as shown in FIG. 1, an active matrix substrate (hereinafter, referred to as "TFT substrate") 1 which has pixel electrodes 12 that are provided in respective one of the plurality of pixels P, a counter substrate (also referred to as "color filter substrate") 2 which opposes the TFT substrate 1, and a vertical alignment liquid crystal layer 3 which is provided between the substrates. The TFT substrate 1 and the counter substrate 2 include insulative transparent substrates (for example, glass substrates) 11 and 21, respectively. The liquid crystal layer 3 includes liquid crystal molecules 3*a* of negative dielectric anisotropy.

The liquid crystal display device 100 further includes a pair of circular polarization plates 40*a* and 40*b* which oppose each other via the liquid crystal layer 3. In the present embodiment, the rear side circular polarization plate (first circular polarization plate) 40*a* is provided on a side of the transparent substrate 11 of the TFT substrate 1 which is opposite to the liquid crystal layer 3. The viewer side circular polarization plate (second circular polarization plate) 40*b* is provided on a side of the transparent substrate 21 of the counter substrate 2 which is opposite to the liquid crystal layer 3. The first circular polarization plate 40*a* is constituted of a linear polarizer 40*a*1 and a ¼-wave plate (λ/4 plate) 40*a*2 that is provided on a side of the linear polarizer 40*a*1 which is closer to the liquid crystal layer 3. Likewise, the second circular polarization plate 40*b* is constituted of a linear polarizer 40*b*1 and a ¼-wave plate (λ/4 plate) 40*b*2 that is provided on a side of the linear polarizer 40*b*1 which is closer to the liquid crystal layer 3. The linear polarizers 40*a*1 and 40*b*1 are in a crossed Nicols arrangement. Specifically, the transmission axis of the linear polarizer 40*a*1 on one side and the transmission axis of the linear polarizer 40*b*1 on the other side are generally perpendicular to each other. The ¼-wave plate 40*a*2 of the first circular polarization plate 40*a* is arranged such that its slow axis forms an angle of about 45° with respect to the transmission axis of the linear polarizer 40*a*1. The ¼-wave plate 40*b*2 of the second circular polarization plate 40*b* is arranged such that its slow axis forms an angle of about 45° with respect to the transmission axis of the linear polarizer 40*b*1.

In the liquid crystal display device 100 that includes a pair of circular polarization plates 40*a* and 40*b* such as those described above, light that is incident on the liquid crystal layer 3 is circularly-polarized light. Thus, the liquid crystal layer 3 modulates the circularly-polarized light, thereby realizing display.

The pixel electrode 12 of the TFT substrate 1 includes a plurality of sub-pixel electrodes 12S as shown in FIG. 1(*b*). Here, two sub-pixel electrodes 12S are arranged along the column direction. Each of the two sub-pixel electrodes 12S includes a cruciform trunk portion 12*a*, a plurality of branch portions 12*b* extending from the trunk portion 12*a* in directions of about 45°, and a plurality of slits 12*c* provided between the plurality of branch portions 12*b*. In the present embodiment, the cruciform trunk portion 12*a* is arranged so as to coincide with the transmission axes (or absorption axes) of the linear polarizers 40*a*1 and 40*b*1. In this way, each of the sub-pixel electrodes 12S has a fishbone structure (comb tooth-like fine electrode structure). Note that the two sub-pixel electrodes 12S are separated from each other by a slit 12*e* but coupled with each other by a connecting portion 12*d*, so that they are not electrically independent of each other.

The counter substrate 2 includes a plurality of counter electrodes 22 which are electrically independent of each other in each of the plurality of pixels P as shown in FIG. 1(*c*). Here, two counter electrodes 22 are arranged along the column direction. In a common-employed liquid crystal display device, the counter electrode is a single undivided electrode which is common among all of the pixel electrodes. On the other hand, in the liquid crystal display device 100 of the present embodiment, a conductive film which is formed in the counter substrate 2 is divided by a slit 22*e* in each pixel P.

The plurality of sub-pixel electrodes 12S and the plurality of counter electrodes 22 are arranged on a one-to-one basis. One sub-pixel electrode 12S and one corresponding counter electrode 22 define one sub-pixel SP. Therefore, in the present embodiment, each pixel P includes two sub-pixels SP which are arranged along the column direction. Further, in the present embodiment, the boundary of adjacent sub-pixel electrodes 12S (the slit 12*e* which separates the two sub-pixel electrodes 12S; see FIG. 1(*b*)) overlaps the boundary of adjacent counter electrodes 22 (the slit 22*e* which separates the two counter electrodes 22; see FIG. 1(*c*)).

The region between the pixel electrode 12 and the liquid crystal layer 3 and the region between the counter electrodes 22 and the liquid crystal layer 3 are provided with a pair of vertical alignment films 32*a* and 32*b* as shown in FIG. 1. In the absence of an applied voltage across the liquid crystal layer 3, the alignment controlling force of the vertical alignment films 32*a* and 32*b* operates on the liquid crystal molecules 3*a* so as to orient generally perpendicular to (specifically, at an angle of about 85° or more with respect to) the surfaces of the vertical alignment films 32*a* and 32*b*.

In the liquid crystal display device 100, the pixel electrode 12 has a fishbone structure such as that described above (comb tooth-like fine electrode structure), and this structure realizes alignment division of each pixel P. Specifically, in the presence of an applied voltage across the liquid crystal layer 3, four types of liquid crystal domains are formed in the liquid crystal layer 3 in each pixel P. The azimuths of four directors that are representative of the orientations of liquid crystal molecules 3*a* that are included in respective ones of the four types of liquid crystal domains are different from one another. Therefore, the azimuthal angle dependence of the viewing angle is decreased, so that display of wide viewing angles is realized. Such a structure which realizes formation of four types of liquid crystal domains is referred to as "four-domain alignment structure" or simply "4D structure".

Now, with further reference to FIG. 2, the relationship between a more specific configuration of the pixel electrode 12 and the azimuths of the directors of the respective liquid crystal domains is described.

As shown in FIG. 2, the trunk portion 12*a* of the sub-pixel electrodes 12S includes a horizontally-extending linear portion (horizontal linear portion) 12*a*1 and a vertically-extending linear portion (vertical linear portion) 12*a*2. The horizontal linear portion 12*a*1 and the vertical linear portion 12*a*2 intersect with each other (at right angles) at the center of the sub-pixel SP.

The plurality of branch portions 12*b* are divided into four groups corresponding to the four regions separated by the cruciform trunk portion 12*a*. Specifically, supposing that the display surface is the clock dial where the azimuth of 0° is identical with the 3 o'clock direction and that the counter-clockwise direction is the positive direction, the plurality of branch portions 12*b* are divided into the first group that is constituted of branch portions 12*b*1 extending in the azimuth of 45°, the second group that is constituted of branch portions 12*b*2 extending in the azimuth of 135°, the third group that is constituted of branch portions 12*b*3 extending in the azimuth of 225°, and the fourth group that is constituted of branch portions 12*b*4 extending in the azimuth of 315°.

In each of the first, second, third, and fourth groups, both the width of each of the plurality of branch portions 12*b*, L, and the interval between adjacent ones of the branch portions 12*b*, S, are typically not less than 1.5 µm and not more than 5.0 µm. From the viewpoint of the stability of alignment of the liquid crystal molecules 3*a* and luminance, it is preferred that the width L and the interval S of the branch portions 12*b* are within the above range. Note that the number of the branch portions 12*b* extending from the horizontal linear portion 12*a*1 of the trunk portion 12*a* and the number of the branch portions 12*b* extending from the vertical linear portion 12*a*2 are not limited to those shown in FIG. 1 and FIG. 2.

Each of the plurality of slits 12*c* extends in the same direction as adjacent ones of the branch portions 12*b*. Specifically, slits 12*c* provided between the first group branch portions 12*b*1 extend in the azimuth of 45°, and slits 12*c* provided between the second group branch portions 12*b*2 extend in the azimuth of 135°. Also, slits 12*c* provided between the third group branch portions 12*b*3 extend in the azimuth of 225°, and slits 12*c* provided between the fourth group branch portions 12*b*4 extend in the azimuth of 315°.

In the presence of an applied voltage, the azimuth in which the liquid crystal molecules 3*a* incline (the azimuthal angle component of the long axes of the liquid crystal molecules 3*a* inclined by an electric field) is defined by an oblique electric field produced in each slit 12*c* (i.e., a space where the conductive film of the pixel electrode 12 does not exist). This azimuth is parallel to the branch portions 12*b* (i.e., parallel to the slits 12*c*) and is identical with a direction toward the trunk portion 12*a* (i.e., an azimuth which is different by 180° from the extension azimuth of the branch portions 12*b*). Specifically, the inclination azimuth defined by the first group branch portions 12*b*1 (first azimuth: arrow A) is the azimuth of 225°, the inclination azimuth defined by the second group branch portions 12*b*2 (second azimuth: arrow B) is the azimuth of 315°, the inclination azimuth defined by the third group branch portions 12*b*3 (third azimuth: arrow C) is the azimuth of 45°, and the inclination azimuth defined by the fourth group branch portions 12*b*4 (fourth azimuth: arrow D) is the azimuth of 135°. The four azimuths A to D described above are equal to the azimuths of the directors of the respective domains of the 4D structure which are formed in the presence of an applied voltage. The azimuths A to D are generally parallel to any of the plurality of branch portions 12*b*. The difference between any two of the azimuths A to D is equal to an integral multiple of 90°. The azimuths of the directors of liquid crystal domains which are adjacent to each other with the trunk portion 12*a* interposed therebetween (e.g., azimuth A and azimuth B) are different from each other by about 90°. Note that, in the present embodiment, the azimuths A to D form an angle of about 45° with the transmission axes of the linear polarizers 40*a*1 and 40*b*1.

As described above, the pixel electrode 12 has a fishbone structure, and accordingly, in the presence of an applied voltage, a plurality of liquid crystal domains are formed in each pixel P. Therefore, the azimuthal angle dependence of the viewing angle is decreased, and display of wide viewing angles is realized. Note that, in the present embodiment, each of the plurality of sub-pixel electrodes 12S has a fishbone structure, and therefore, four types of liquid crystal domains are formed in each of the plurality of sub-pixels SP. That is, a 4D structure is formed in each sub-pixel SP. The pixel electrode 12 does not need to have multiple ones of the cruciform trunk portion 12*a* but may have at least one. However, from the viewpoint of the viewing angle characteristics, the pixel electrode 12 preferably has a plurality of sub-pixel electrodes 12S each of which includes a cruciform trunk portion 12*a*. That is, it is preferred that a 4D structure is formed in each of the sub-pixels SP. Note that, in that case, from the viewpoint of achieving a high aperture ratio, the boundary of adjacent sub-pixel electrodes 12S (i.e., the slit 12*e*) overlaps the boundary of adjacent counter electrodes 22 (i.e., the slit 22*e*).

Further, in the liquid crystal display device 100, a plurality of counter electrodes 22 which are electrically independent of each other are provided in each pixel P. Therefore, in order to display at least part of the middle grayscale levels, potentials which are different from one another can be applied to the plurality of counter electrodes 22. Thus, different effective voltages can be applied across the liquid crystal layers 3 of respective ones of the two sub-pixels SP, and the two sub-pixels SP can provide different luminances.

Thus, in the liquid crystal display device 100 of the present embodiment, multi-pixel driving is realized by the electrode structure which is provided on the counter substrate 2 side. This is in contrast to conventional, commonly-employed multi-pixel driving techniques where multi-pixel driving is realized by the electrode structure which is provided on the active matrix substrate side. Note that, in the conventional, commonly-employed multi-pixel driving techniques, regions of the pixel electrode which are supplied with different potentials are referred to as "sub-pixel electrodes", whereas in the liquid crystal display device 100 of the present embodiment, the minimum unit of the pixel electrode 12 for realizing the 4D structure is referred to as "sub-pixel electrode".

Figure 3:
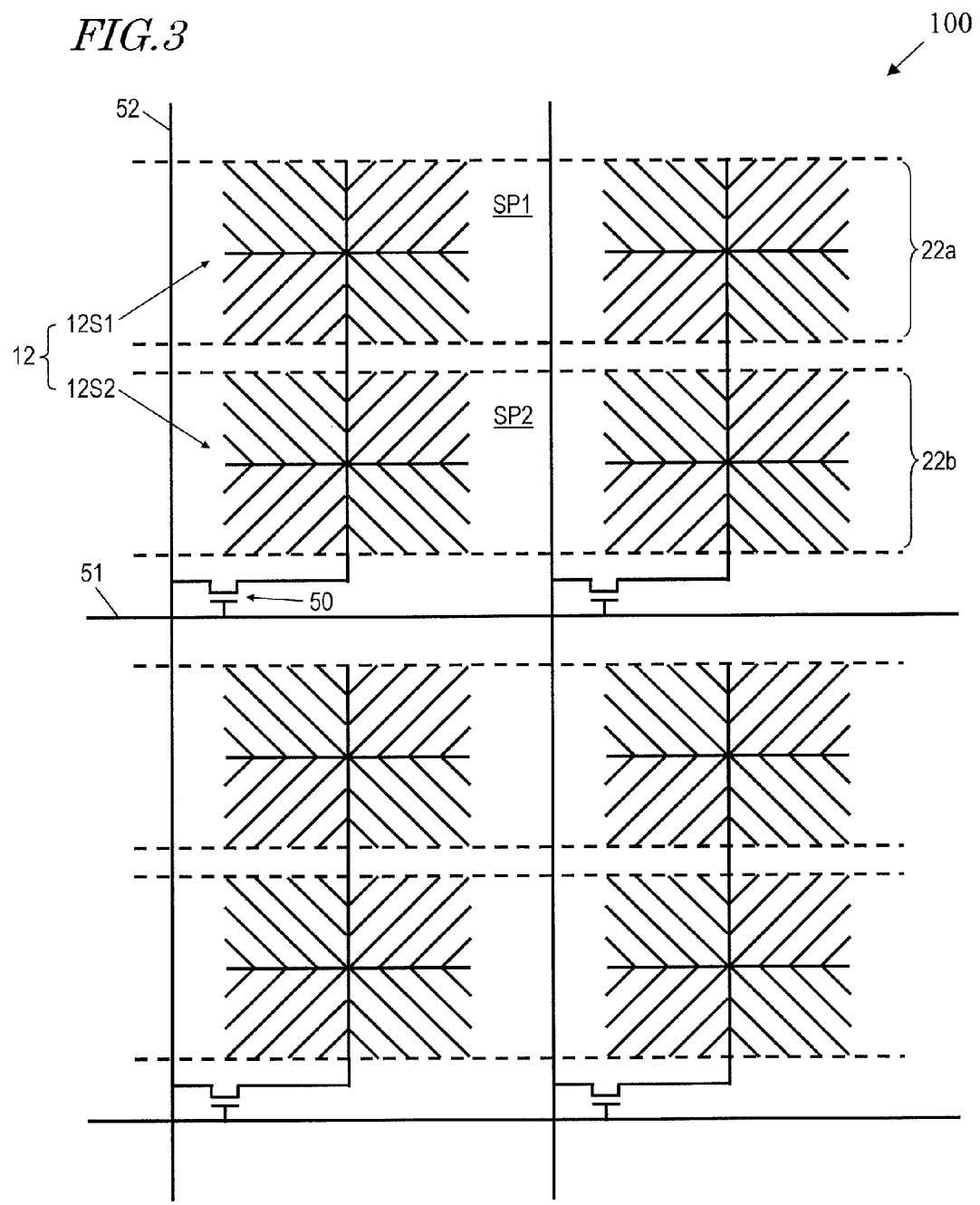
FIG. 3 A plan view schematically showing a region corresponding to four pixels P of the liquid crystal display device 100.
Figure 4:
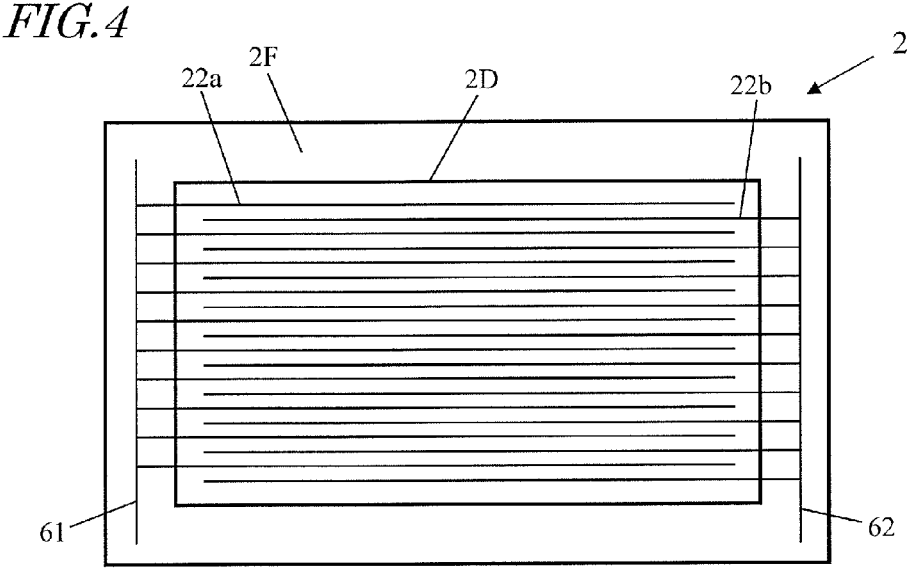
FIG. 4 A plan view schematically showing a wiring structure of the counter substrate 2 of the liquid crystal display device 100.

Here, a more specific configuration example where different potentials are supplied to the plurality of counter electrodes 22 for realizing multi-pixel driving is described with reference to FIG. 3 and FIG. 4. FIG. 3 is a diagram showing a region corresponding to four pixels P of the liquid crystal display device 100. FIG. 4 is a diagram showing a wiring structure of the counter substrate 2.

In the description provided hereinbelow, a sub-pixel SP which is provided in the upper part of the pixel P and a sub-pixel SP which is provided in the lower part are referred to as "first sub-pixel" and "second sub-pixel", respectively, which are denoted as "SP1" and "SP2" in FIG. 3. A sub-pixel electrode 12S which is provided in the upper part of the pixel P and a sub-pixel electrode 12S which is provided in the lower part are referred to as "first sub-pixel electrode" and "second sub-pixel electrode", respectively, which are denoted as "12S1" and "12S2" in FIG. 3. A counter electrode 22 which is provided in the upper part of the pixel P and a counter electrode 22 which is provided in the lower part are referred to as "first counter electrode" and "second counter electrode", respectively, which are denoted as "22*a*" and "22*b*" in FIG. 3 and FIG. 4.

As shown in FIG. 3, each pixel P is provided with one thin film transistor (TFT) 50. The TFT 50 is supplied with a scan signal from a scan line (gate line) 51 extending in the row direction and a video signal from a signal line (source line) 52 extending in the column direction.

The pixel electrode 12 is coupled to this TFT 50. Specifically, the second sub-pixel electrode 12S2 is directly coupled to the TFT 50, and the first sub-pixel electrode 12S1 is coupled to the TFT 50 via the second sub-pixel electrode 12S2. That is, the first sub-pixel electrode 12S1 and the second sub-pixel electrode 12S2 are electrically coupled to the common (identical) TFT 50.

The first counter electrode 22*a* of a pixel P is connected to the first counter electrode 22*a* of an adjacent pixel P which is contiguously placed along the row direction. Meanwhile, the second counter electrode 22*b* of a pixel P is connected to the second counter electrode 22*b* of an adjacent pixel P which is contiguously placed along the row direction. Thus, when the entirety of the plurality of pixels P is observed, the first counter electrodes 22*a* extending in the row direction and the second counter electrodes 22*b* extending likewise in the row direction alternately occur along the column direction.

As shown in FIG. 4, the counter substrate 2 includes a display region 2D which is defined by the plurality of pixels P and a frame region 2F which surrounds the display region 2D. All of the first counter electrodes 22*a* are coupled to a common line 61 which is provided in the left side part of the frame region 2F. All of the second counter electrodes 22*b* are coupled to a common line 62 which is provided in the right side part of the frame region 2F. The line 61 which is coupled to the first counter electrodes 22*a* and the line 62 which is coupled to the second counter electrodes 22*b* are supplied with different voltages (counter voltages), whereby the first counter electrodes 22a and the second counter electrodes 22b are supplied with different potentials. Therefore, it is possible to apply different voltages across the liquid crystal layer 3 of the first sub-pixel SP1 and the liquid crystal layer 3 of the second sub-pixel SP2.

For example, when the potential of the pixel electrode 12 is +5 V, supplying a potential of 0 V to the first counter electrode 22a and a potential of +1 V to the second counter electrode 22b results in that the voltage which is applied across the liquid crystal layer 3 of the first sub-pixel SP1 is 5 V while the voltage which is applied across the liquid crystal layer 3 of the second sub-pixel SP2 is 4 V.

As described above, in the liquid crystal display device 100 of the present embodiment, the pixel electrode 12 has a fishbone structure although circularly-polarized light is utilized, and therefore, the alignment state of the liquid crystal layer 3 is not a radial inclination alignment (axially-symmetric alignment) but a four-domain alignment. Thus, by performing multi-pixel driving, the γ shift and the whitening phenomenon which is attributed to the γ shift can be sufficiently reduced. The fishbone structure has a large number of fine stripes 12c, and therefore, there is a probability that the proportion of a region of the pixel electrode 12 in which the conductive film is provided is smaller than in the electrode structure of the CPA mode. However, when the fishbone structure is employed, it is not necessary to provide an opening or protrusion in the counter electrode for stabilizing the alignment as is in the CPA mode. Thus, even when the fishbone structure is employed instead of the electrode structure of the CPA mode, the decrease of the transmittance would not matter. In other words, the decrease of the transmittance which is attributed to the structure of the pixel electrode 12 can be compensated for by absence of necessity for provision of an alignment stabilizing structure in the counter electrode 22. According to the conventional techniques, the fishbone structure pixel electrode is usually used in combination with a configuration which utilizes linearly-polarized light. In the liquid crystal display device 100 of the present embodiment, however, the fishbone structure pixel electrode 12 is used in combination with a configuration which utilizes circularly-polarized light. This enables it to contribute to the transmittance no matter which azimuth the liquid crystal molecules 3a are oriented in (i.e., the phase difference can be given to light passing through the liquid crystal layer 3 so long as the liquid crystal molecules 3a are inclined in response to an applied voltage). Therefore, even if the alignment is disturbed in a gap portion of the slits 12c (i.e., over the branch portions 12b), the disturbed alignment would not cause a decrease in transmittance. When multi-pixel driving is performed, some of the plurality of sub-pixels SP are made darker than the other. Therefore, there is a concern that the darker sub-pixels may decrease the light utilization efficiency. However, in the liquid crystal display device 100 of the present embodiment, the multi-pixel driving is realized by the electrode structure on the counter substrate 2 side (specifically, by providing a plurality of counter electrodes 22 which are electrically independent of each other in each pixel P), and therefore, it is not necessary to provide a plurality of TFTs 50 in each pixel P, and a high aperture ratio can be realized as compared with the case of using a conventional, commonly-employed multi-pixel driving technique where the multi-pixel driving is realized by the electrode structure on the TFT substrate side. Thus, the decrease of light utilization efficiency which is attributed to the multi-pixel driving would not matter. As described above, in the liquid crystal display device 100 of the present embodiment, the γ shift can be sufficiently reduced, and the decrease in transmittance can be prevented. Thus, display in which the viewing angle dependence of the γ characteristic is small and which is bright can be realized.

Note that it is further preferred to use the PSA technology (Polymer Sustained Alignment Technology) in the liquid crystal display device 100 of the present embodiment. Using the PSA technology enables to further improve the response speed and the alignment stability.

Figure 5:
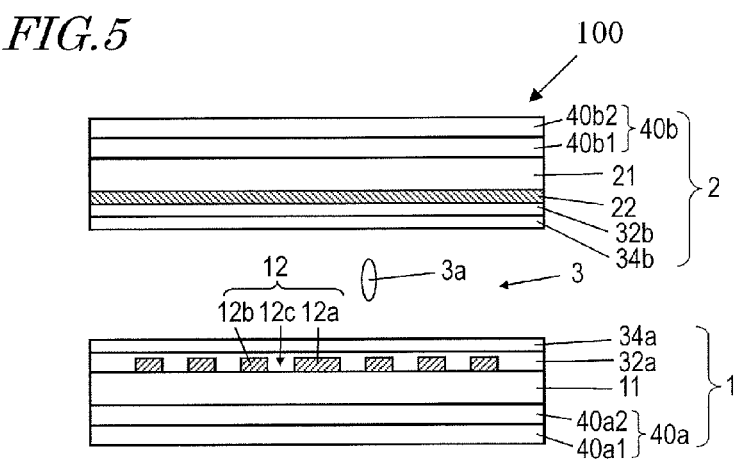
FIG. 5 A cross-sectional view schematically showing a region corresponding to one pixel P of the liquid crystal display device 100.

FIG. 5 shows a cross-sectional view which illustrates the case where the PSA technology is employed in the liquid crystal display device 100. As shown in FIG. 5, surfaces of the vertical alignment films 32a and 32b which are closer to the liquid crystal layer 3 are provided with a pair of alignment sustaining layers 34a and 34b which are made of a photopolymerized material.

The alignment sustaining layers 34a and 34b may be formed by polymerizing a photopolymerizable compound (typically, a photopolymerizable monomer) which is contained in a prepared liquid crystal material in the presence of an applied voltage across the liquid crystal layer 3 after formation of a liquid crystal panel. Before the polymerization of the photopolymerizable compound, the orientation of the liquid crystal molecules 3a contained in the liquid crystal layer 3 is controlled by the vertical alignment films 32a and 32b. When a sufficiently high voltage (e.g., white display voltage) is applied across the liquid crystal layer 3, the liquid crystal molecules 3a incline in predetermined azimuths due to oblique electric fields which are attributed to the fishbone structure of the pixel electrode 12. The alignment sustaining layers 34a and 34b function to sustain (memorize) an alignment of the liquid crystal molecules 3a which occurs in the presence of an applied voltage across the liquid crystal layer 3 even after removal of the voltage (in the absence of an applied voltage). Therefore, the pretilt azimuths of the liquid crystal molecules 3a which are defined by the alignment sustaining layers 34a and 34b (the azimuths in which the liquid crystal molecules 3a incline in the absence of an applied voltage) conform to the azimuths in which the liquid crystal molecules 3a incline in the presence of an applied voltage.

The alignment sustaining layers 34a and 34b may be formed using a known PSA technology. The PSA technology is disclosed in, for example, Japanese Laid-Open Patent Publication No. 2003-149647, Japanese Laid-Open Patent Publication No. 2006-78968, Japanese Laid-Open Patent Publication No. 2003-177418, Japanese Laid-Open Patent Publication No. 2003-287753, and Japanese Laid-Open Patent Publication No. 2006-330638.

In FIG. 5, each of the alignment sustaining layers 34a and 34b is shown as a continuous film-like layer for the sake of convenience, although the alignment sustaining layers 34a and 34b are not limited to such a form. Each of the alignment sustaining layers 34a and 34b may be constituted of a plurality of pieces (islands) that are discretely formed.

As described above, it is preferred to employ the PSA technology in the liquid crystal display device 100 of the present embodiment. In the liquid crystal display device 100 that employs the fishbone structure pixel electrode 12, a protrusion (which is also referred to as "rivet") for stability of the alignment is not provided on the counter substrate 2 side, and therefore, it is necessary to sufficiently stabilize the alignment by means of the slits 12c of the pixel electrode 12. Thus, when the voltage applied across the liquid crystal layer 3 is abruptly increased from a level which is equal to or lower than the threshold voltage to a level which is equal to or higher than the saturation voltage (when the display state is quickly changed from the black display state to the white display), the liquid crystal molecules 3a abruptly fall before the alignment of the liquid crystal molecules 3a is defined by means of oblique electric fields produced in the slits 12c, so that the alignment is disturbed, although such a problem would not occur when the voltage applied across the liquid crystal layer 3 is increased stepwise. In that case, some of the liquid crystal molecules 3a are oriented parallel to the azimuths of the extending directions of the slits 12c (i.e., in desired azimuths), while the remaining liquid crystal molecules 3a form a reverse tilt domain or a point disclination so that the alignment disturbance can remain, and this may cause display roughness.

When the PSA technology is used, the voltage applied across the liquid crystal layer 3 is increased stepwise so that the stable alignment state can be formed, and light irradiation is performed in this state, whereby the alignment sustaining layers 34a and 34b which accord with the inclination azimuths of the liquid crystal molecules 3a can be formed over the vertical alignment films 32a and 32b. Therefore, even when display is performed such that the voltage applied across the liquid crystal layer 3 is abruptly increased, occurrence of alignment disturbance (display roughness) can be prevented because the azimuths of the orientations of the liquid crystal molecules 3a are defined by the alignment sustaining layers 34a and 34b.

The present inventor specifically verified the effect of reducing the γ shift and the effect of preventing the decrease in transmittance in the liquid crystal display device 100 of the present embodiment in comparison with the CPA mode which utilizes circularly-polarized light. The results of the verification are described below.

First, the difference between the alignment state in the CPA mode and the alignment state in the four-domain alignment structure which is formed by the fishbone structure and the difference between the configuration which utilizes linearly-polarized light and the configuration which utilizes circularly-polarized light are described prior to the description of the verification results.

Figure 6:
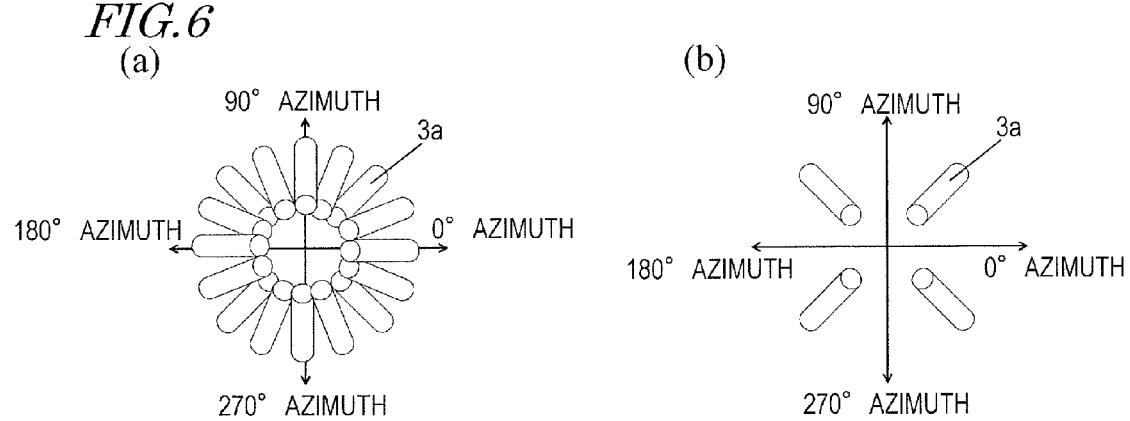
FIG. 6(*a*) is a diagram showing the alignment state of liquid crystal molecules 3*a* in the CPA mode. (*b*) is a diagram showing the alignment state of liquid crystal molecules 3*a* in a four-domain alignment structure which is formed by a fishbone structure.

FIG. 6(a) shows the alignment state of the liquid crystal molecules 3a in the CPA mode. FIG. 6(b) shows the alignment state of the liquid crystal molecules 3a in a four-domain alignment structure which is formed by a fishbone structure.

In the CPA mode, the liquid crystal molecules 3a are oriented in all the azimuths as shown in FIG. 6(a). This is because the liquid crystal molecules 3a fall toward a protrusion provided on the counter substrate or an opening formed in the counter electrode (either of which is provided at a position corresponding to the center of each of a plurality of unit solid portions of the pixel electrode).

Since the liquid crystal molecules 3a are oriented in all the azimuths in the CPA mode, in the configuration which utilizes linearly-polarized light, liquid crystal molecules 3a which are oriented in an azimuth parallel to and an azimuth perpendicular to the polarization direction of the linearly-polarized light entering the liquid crystal layer do not contribute to the transmittance, so that the transmittance decreases. On the other hand, in the configuration which utilizes circularly-polarized light, the liquid crystal molecules 3a that are oriented in all the azimuths contribute to the transmittance, so that the transmittance can be improved.

On the other hand, in the four-domain alignment structure, the liquid crystal molecules 3a are oriented in the azimuth of 45°, the azimuth of 135°, the azimuth of 225°, and the azimuth of 315° as shown in FIG. 6(b). This is because the liquid crystal molecules 3a fall parallel to the slits 12c of the fishbone structure (i.e., also parallel to the branch portions 12b).

Thus, in the four-domain alignment structure, the liquid crystal molecules 3a are oriented in specific azimuths, and therefore, according to the conventional techniques, the four-domain alignment structure is usually combined with the configuration which utilizes linearly-polarized light. By arranging the transmission axes (or absorption axes) of the linear polarization plates so as to form an angle of 45° with respect to the orientation azimuths of the liquid crystal molecules 3a, the light utilization efficiency can be maximized (i.e., the transmittance can be maximized). Note that the reason why the liquid crystal molecules 3a are oriented in the azimuth of 45°, the azimuth of 135°, the azimuth of 225°, and the azimuth of 315° is that the transmission axes (or absorption axes) of the linear polarization plates are arranged parallel to the horizontal direction (the azimuth of 0°) or the vertical direction (the azimuth of 90°) of the display surface. When observing the display surface, the viewing angle is inclined along the horizontal direction (right-and-left direction) or vertical direction (top-and-bottom direction) of the display surface in many cases. With such an arrangement, when the viewing angle is inclined along the horizontal direction or the vertical direction, the transmission axes of the linear polarization plates that are in a crossed Nicols arrangement would not deviate from the orthogonal relationship. Thus, light leakage which may occur when the display surface is observed from an oblique direction can be prevented, and the viewing angle (equal contrast) range along the top-and-bottom and right-and-left directions can be enlarged.

Figure 7:
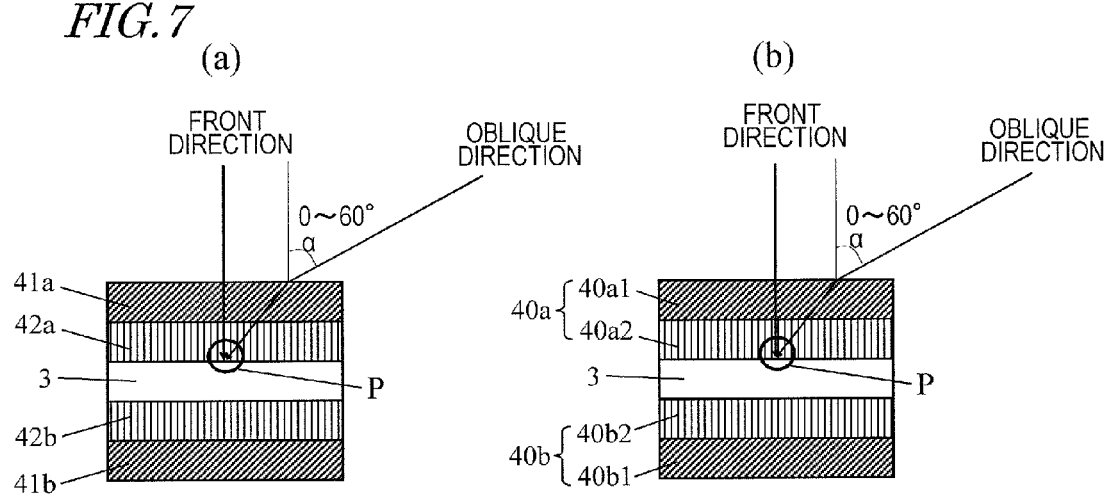
FIG. 7(*a*) is a cross-sectional view showing an example of a configuration for utilizing linearly-polarized light (i.e., for realizing display by modulating linearly-polarized light). (*b*) is a cross-sectional view showing an example of a configuration for utilizing circularly-polarized light (i.e., for realizing display by modulating circularly-polarized light).
Figure 8:
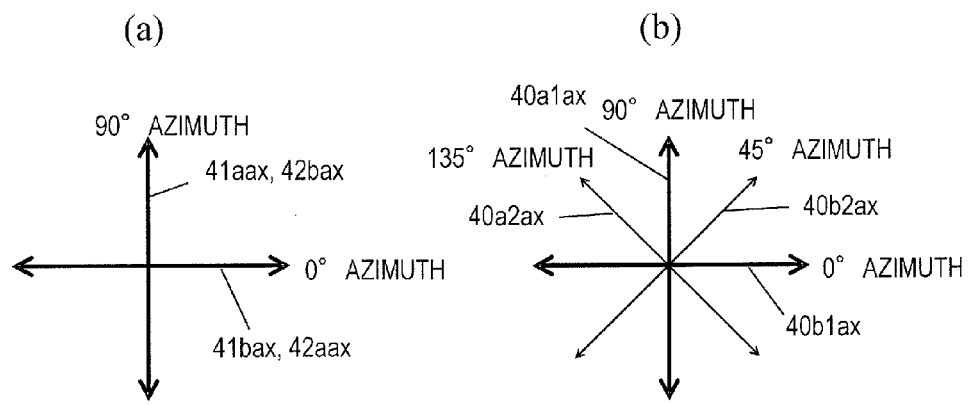
FIG. 8(*a*) is a diagram showing the arrangement of optical axes in the configuration shown in FIG. 7(*a*). (*b*) is a diagram showing the arrangement of optical axes in the configuration shown in FIG. 7(*b*).

FIG. 7(a) shows an example of a configuration for utilizing linearly-polarized light. FIG. 7(b) shows an example of a configuration for utilizing circularly-polarized light. FIG. 8(a) shows the arrangement of optical axes in the configuration shown in FIG. 7(a). FIG. 8(b) shows the arrangement of optical axes in the configuration shown in FIG. 7(b). Note that in FIGS. 7(a) and 7(b) the rear side is shown on the upper side and the viewer side is shown on the lower side, whereas in FIG. 1 and FIG. 5 the rear side is shown on the lower side and the viewer side is shown on the upper side.

As shown in FIG. 7(a), in the configuration which utilizes linearly-polarized light, a pair of linear polarization plates 41a and 41b which oppose each other via the liquid crystal layer 3 are provided. In the example shown in FIG. 7(a), sides of the linear polarization plates 41a and 41b which are closer to the liquid crystal layer 3 are provided with dual-axis phase plates 42a and 42b for preventing light leakage which may occur in the case of observation from an oblique direction (which is attributed to deviation of the transmission axes of the linear polarization plates 41a and 41b from the orthogonal state). Each of the dual-axis phase plates 42a and 42b is configured such that the phase difference in the in-plane direction, Rxy, is 60 nm and the phase difference in the thickness direction, Rth, is 100 nm.

As shown in FIG. 8(a), the linear polarization plate 41a on the rear side is arranged such that its absorption axis 41aax is coincident with the azimuth of 90°, and the linear polarization plate 41b on the viewer side is arranged such that its absorption axis 41bax is coincident with the azimuth of 0°. That is, the linear polarization plates 41a and 41b are in a crossed Nicols arrangement. The dual-axis phase plate 42a on the rear side is arranged such that its slow axis 42aax is coincident with the azimuth of 0°, and the dual-axis phase plate 42b on the viewer side is arranged such that its slow axis 42bax is coincident with the azimuth of 90°. That is, in this example, the dual-axis phase plates 42a and 42b that have equal phase differences are arranged such that the azimuths of the slow axes 42aax and 42bax are different from each other.

On the other hand, as shown in FIG. 7(b), in the configuration which utilizes circularly-polarized light, a pair of circular polarization plates 40a and 40b which oppose each other via the liquid crystal layer 3 are provided. In the example shown in FIG. 7(b), the rear side circular polarization plate 40a is constituted of the linear polarizer 40a1 and the ¼-wave plate 40a2 that is provided on a side of the linear polarizer 40a1 which is closer to the liquid crystal layer 3. Likewise, the circular polarization plate 40b on the viewer side is constituted of the linear polarizer 40b1 and the ¼-wave plate 40b2 that is provided on a side of the linear polarizer 40b1 which is closer to the liquid crystal layer 3. Each of the ¼-wave plates 40a2 and 40b2 is configured such that the phase difference in the in-plane direction, Rxy, is 138 nm and the phase difference in the thickness direction, Rth, is 160 nm.

As shown in FIG. 8(b), the linear polarizer 40a1 on the rear side is arranged such that its absorption axis 40a1ax is coincident with the azimuth of 90°, and the linear polarizer 40b1 on the viewer side is arranged such that its absorption axis 40b1ax is coincident with the azimuth of 0°. That is, the linear polarizers 40a1 and 40b1 are in a crossed Nicols arrangement. The ¼-wave plate 40a2 on the rear side is arranged such that its slow axis 40a2ax is coincident with the azimuth of 135°, and the ¼-wave plate 40b2 on the viewer side is arranged such that its slow axis 40b2ax is coincident with the azimuth of 45°, That is, the ¼-wave plates 40a2 and 40b2 that have equal phase differences are arranged such that the azimuths of the slow axes 40a2ax and 40b2ax are different from each other.

The present inventor calculated the polarization state of light that is incident on the liquid crystal layer 3 (the polarization state at the interface between the dual-axis phase plate 42a or the ¼-wave plate 40a2 and the liquid crystal layer 3) by simulation for the case where linearly-polarized light is utilized (the configuration shown in FIG. 7(a)) and the case where circularly-polarized light is utilized (the configuration shown in FIG. 7(b)). The results of the calculation are shown in FIG. 9 and FIG. 10. FIG. 9 and FIG. 10 show the variation of the polarization state with the light incident direction varied from the front direction toward the right side (azimuth of 0°) in the polar angle (α) range of 0° to 60° (for FIG. 10, in the range of −80° to +80°) where the direction normal to the display surface is the front direction (polar angle α=0°). In FIGS. 7(a) and 7(b), the path of the entering light in that case and the observation point P of the polarization state are shown. FIGS. 9(a) and 9(b) are diagrams showing the locus of the tip of the electric field vector of the light that is incident on the liquid crystal layer 3. FIGS. 10(a) and 10(b) are graphs showing the polarization state of the light that is incident on the liquid crystal layer 3 which is in a numerical expression with the ratio of S1 (horizontal polarization component), S2 (45° linear polarization component), and S3 (circular polarization component). S1, S2, and S3 are referred to as "Stokes Parameters". FIG. 9(a) and FIG. 10(a) each show the result for the case where linearly-polarized light is utilized. FIG. 9(b) and FIG. 10(b) each show the result for the case where circularly-polarized light is utilized.

It is appreciated from FIG. 9(a) that, in the configuration which utilizes linearly-polarized light, light that is incident on the liquid crystal layer 3 from the front direction (α=0°) and light that is incident on the liquid crystal layer 3 from an oblique direction (α=10° to 60°) have the same polarization state (i.e., both of them are linearly-polarized light). On the other hand, it is appreciated from FIG. 9(b) that, in the configuration which utilizes circularly-polarized light, light that is incident on the liquid crystal layer 3 from the front direction (α=0°) and light that is incident on the liquid crystal layer 3 from an oblique direction (α=10° to 60°) have largely different polarization states. Specifically, it is appreciated that the light that is incident on the liquid crystal layer 3 from the front direction is circularly-polarized light, while the light that is incident on the liquid crystal layer 3 from an oblique direction is elliptically-polarized light. This tendency increases as the polar angle α increases, and the ellipticity of the elliptically-polarized light (the ratio of the length of the long axis and the length of the short axis) decreases. That is, as the polar angle α increases, the oblateness of the elliptically-polarized light increases.

It is appreciated from FIG. 10(a) that, in the configuration which utilizes linearly-polarized light, the ratio of S1, S2, and S3 does not vary in the light that is incident on the liquid crystal layer 3 from the front direction and the light that is incident on the liquid crystal layer 3 from an oblique direction, and the polarization state is equal without depending on the largeness of the polar angle α. On the other hand, it is appreciated from FIG. 10(b) that, in the configuration which utilizes circularly-polarized light, the light that is incident on the liquid crystal layer 3 from the front direction and the light that is incident on the liquid crystal layer 3 from an oblique direction have largely different polarization states, and as the light incident direction inclines from the front direction (as the polar angle α increases), the proportion of S3 (circular polarization component) decreases while the proportion of S2 (45° linear polarization component) increases.

As described above, in the configuration which utilizes circularly-polarized light, the light that is incident on the liquid crystal layer 3 from an oblique direction is elliptically-polarized light. As will be described later, this is one of the reasons that the γ shift is large in the CPA mode which utilizes circularly-polarized light.

Next, the results of the verification of the effect of reducing the γ shift and the effect of preventing the decrease in transmittance in the liquid crystal display device 100 of the present embodiment are described. Here, the verification was carried out on eight types of liquid crystal display devices shown in Table 1 below.

TABLE 1

| Type | Alignment State with Applied Voltage | Multi-pixel Driving | Polarized Light which is Utilized |
|---|---|---|---|
| 1 | Radial Inclination Alignment (CPA mode) | None | Linearly-Polarized Light |
| 2 | | | Circularly-Polarized Light |
| 3 | | Counter Division Driving | Linearly-Polarized Light |
| 4 | | | Circularly-Polarized Light |
| 5 | Four-domain Alignment by Fishbone Structure | None | Linearly-Polarized Light |
| 6 | | | Circularly-Polarized Light |
| 7 | | Counter Division Driving | Linearly-Polarized Light |
| 8 | | | Circularly-Polarized Light |

The type 1 to type 4 liquid crystal display devices are CPA-mode liquid crystal display devices in which the alignment state in the presence of an applied voltage is a radial inclination alignment (axially-symmetric alignment). On the other hand, the type 5 to type 8 liquid crystal display devices include a pixel electrode which has a fishbone structure in which the alignment state in the presence of an applied voltage is a four-domain alignment. In the type 1, type 2, type 5, and type 6 liquid crystal display devices, the multi-pixel driving is not performed. On the other hand, in the type 3, type 4, type 7, and type 8 liquid crystal display devices, the counter electrode is divided in each pixel (i.e., a plurality of counter electrodes which are electrically separate from one another are provided in each pixel), whereby the multi-pixel driving is realized (in Table 1, shown as "Counter Division Driving"). In the type 1, type 3, type 5, and type 7 liquid crystal display devices, the polarized light which is utilized is linearly-polarized light. On the other hand, in the type 2, type 4, type 6, and type 8 liquid crystal display devices, the polarized light which is utilized is circularly-polarized light. The type 8 liquid crystal display device is an inventive example corresponding to the liquid crystal display device 100 of the present embodiment. The type 1 to type 7 liquid crystal display devices are comparative examples.

Figure 11:
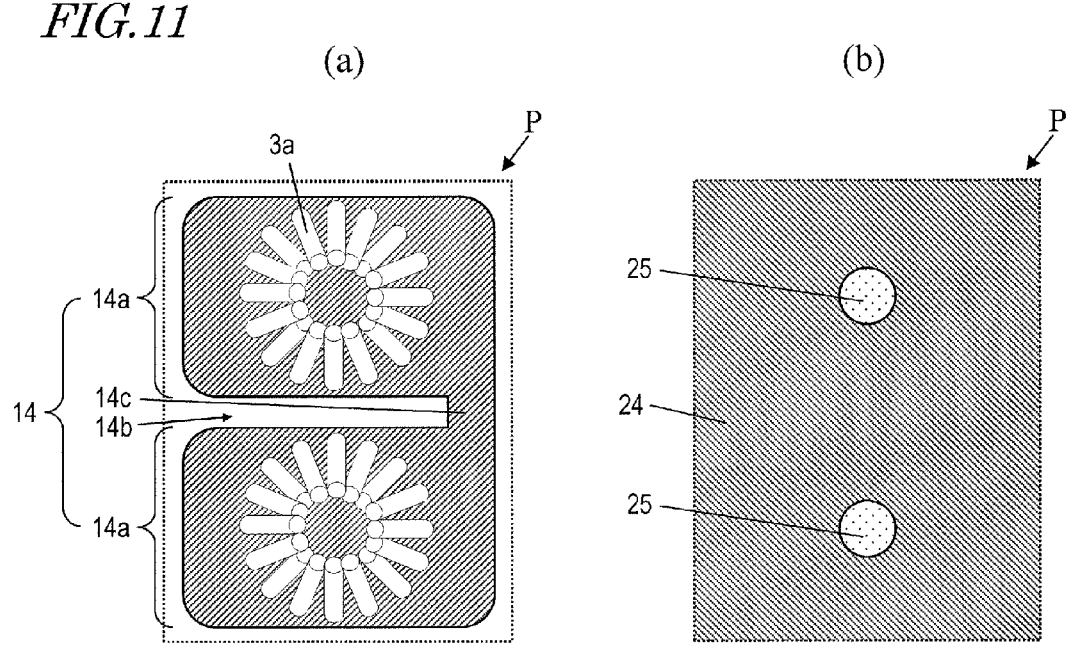
FIG. 11 Diagrams schematically showing electrode structures in one pixel P of the type 1 and type 2 liquid crystal display devices which perform display in the CPA mode. (a) is a plan view showing the electrode structure on the TFT substrate side. (b) is a plan view showing the electrode structure on the counter substrate side.

FIGS. 11(a) and 11(b) show the electrode structures in one pixel P of the type 1 and type 2 liquid crystal display devices. FIG. 11(a) is a plan view showing the electrode structure on the TFT substrate side. FIG. 11(b) is a plan view showing the electrode structure on the counter substrate side.

As shown in FIG. 11(a), a pixel electrode 14 which is made of a transparent conductive material (e.g., ITO or IZO) is provided on the TFT substrate side. The pixel electrode 14 includes two unit solid portions 14a and a slit 14b which is provided between the two unit solid portions 14a. Each of the two unit solid portions 14a has a generally-rectangular shape with arc-shaped corners. The unit solid portions 14a are electrically coupled with each other by a connecting portion 14c. The width of the slit 14b is 6 µm to 10 µm.

As shown in FIG. 11(b), a counter electrode 24 which is made of a transparent conductive material (e.g., ITO or IZO) is provided on the counter substrate side. The counter electrode 24 is a conductive film which is continuously formed over the entirety of the counter substrate. The counter electrode 24 is a single undivided electrode which is common among all of the pixels P. On the counter electrode 24, protrusions 25 are provided at positions corresponding to the centers of the unit solid portions 14a for stabilizing the alignment. The protrusions (which are also referred to as "rivets") 25 are made of a resin material (e.g., an acrylic resin or a novolac resin).

Figure 12:
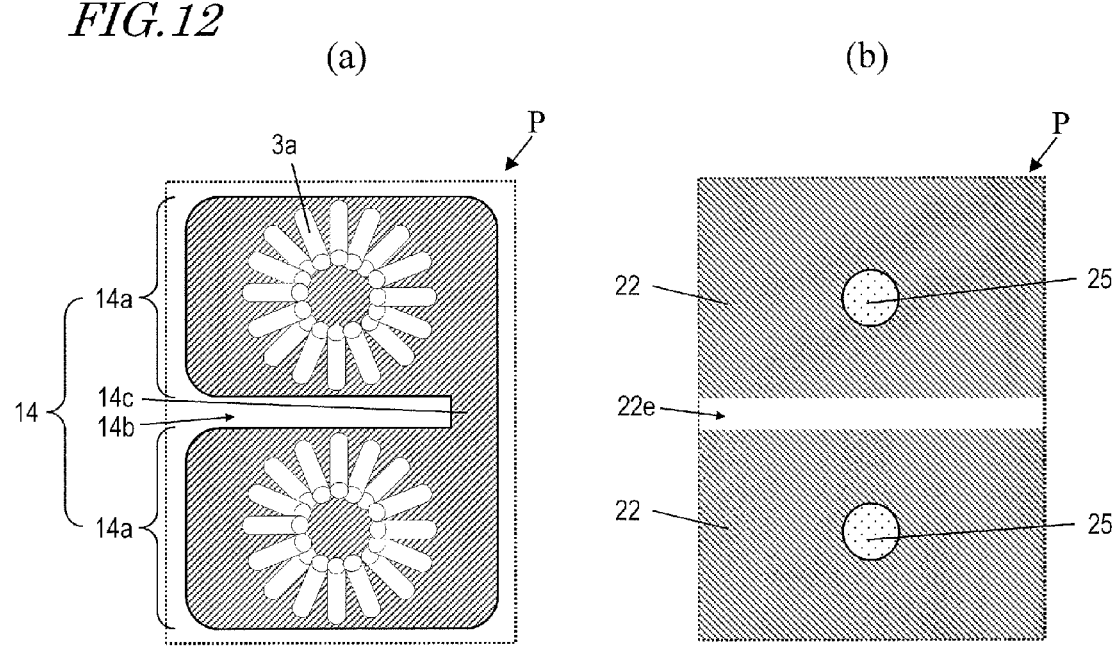
FIG. 12 Diagrams schematically showing electrode structures in one pixel P of the type 3 and type 4 liquid crystal display devices which perform display in the CPA mode. (a) is a plan view showing the electrode structure on the TFT substrate side. (b) is a plan view showing the electrode structure on the counter substrate side.

FIGS. 12(a) and 12(b) show the electrode structures in one pixel P of the type 3 and type 4 liquid crystal display devices. FIG. 12(a) is a plan view showing the electrode structure on the TFT substrate side. FIG. 12(b) is a plan view showing the electrode structure on the counter substrate side.

As shown in FIG. 12(a), on the TFT substrate side, the pixel electrode 14 which is the same as the pixel electrode 14 of the type 1 and type 2 liquid crystal display devices, i.e., the pixel electrode 14 that has the two unit solid portions 14a and the slit 14b, is provided.

As shown in FIG. 12(b), on the counter substrate side, two counter electrodes 22 which are electrically independent of each other are provided in each pixel P. The counter electrodes 22 are separated from each other by a slit 22e which has a width of 6 µm to 10 µm. On the counter electrode 22, protrusions 25 are provided at positions corresponding to the centers of unit solid portions 24a for stabilizing the alignment.

In the type 1 to type 4 liquid crystal display devices, in the presence of an applied voltage across the liquid crystal layer, the alignment controlling force of an oblique electric field produced in the vicinity of the perimeter edge of the unit solid portions 14a of the pixel electrode 14 and the alignment controlling force of the protrusions 25 control the liquid crystal molecules 3a so as to orient in all the azimuths as shown in FIG. 11(a) and FIG. 12(a). In the type 3 and type 4 liquid crystal display devices, the two counter electrodes 22 that are electrically independent of each other are provided in each pixel P. Thus, the multi-pixel driving can be realized by supplying different potentials to respective ones of the two counter electrodes 22.

Figure 13:
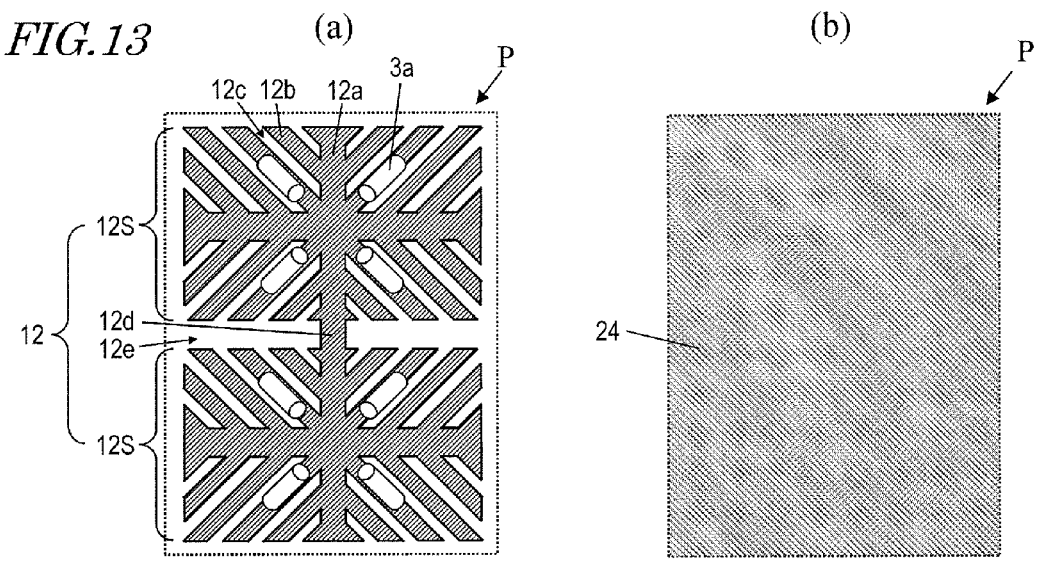
FIG. 13 Diagrams schematically showing electrode structures in one pixel P of the type 5 and type 6 liquid crystal display devices which include a fishbone structure pixel electrode 12. (a) is a plan view showing the electrode structure on the TFT substrate side. (b) is a plan view showing the electrode structure on the counter substrate side.

FIGS. 13(a) and 13(b) show the electrode structures in one pixel P of the type 5 and type 6 liquid crystal display devices. FIG. 13(a) is a plan view showing the electrode structure on the TFT substrate side. FIG. 13(b) is a plan view showing the electrode structure on the counter substrate side.

As shown in FIG. 13(a), a pixel electrode 12 which is made of a transparent conductive material (e.g., ITO or IZO) is provided on the TFT substrate side. The pixel electrode 12 includes two sub-pixel electrodes 12S. Each of the two sub-pixel electrodes 12S includes a cruciform trunk portion 12a, a plurality of branch portions 12b extending from the trunk portion 12a in the directions of about 45°, and a plurality of slits 12c which are formed between the plurality of branch portions 12b. That is, each of the two sub-pixel electrodes 12S has a fishbone structure. The width of the slits 12c is 2 µm to 4 µm. The sub-pixel electrodes 12S are separated from each other by a slit 12e which has a width of 6 µm to 10 µm but coupled with each other by a connecting portion 12d, so that they are not electrically independent of each other.

As shown in FIG. 13(b), a counter electrode 24 which is made of a transparent conductive material (e.g., ITO or IZO) is provided on the counter substrate side. The counter electrode 24 is a conductive film which is continuously formed over the entirety of the counter substrate. The counter electrode 24 is a single undivided electrode which is common among all of the pixels P. On the counter electrode 24, the protrusions 25 such as those provided in the type 1 to type 4 liquid crystal display devices are not provided.

Figure 14:
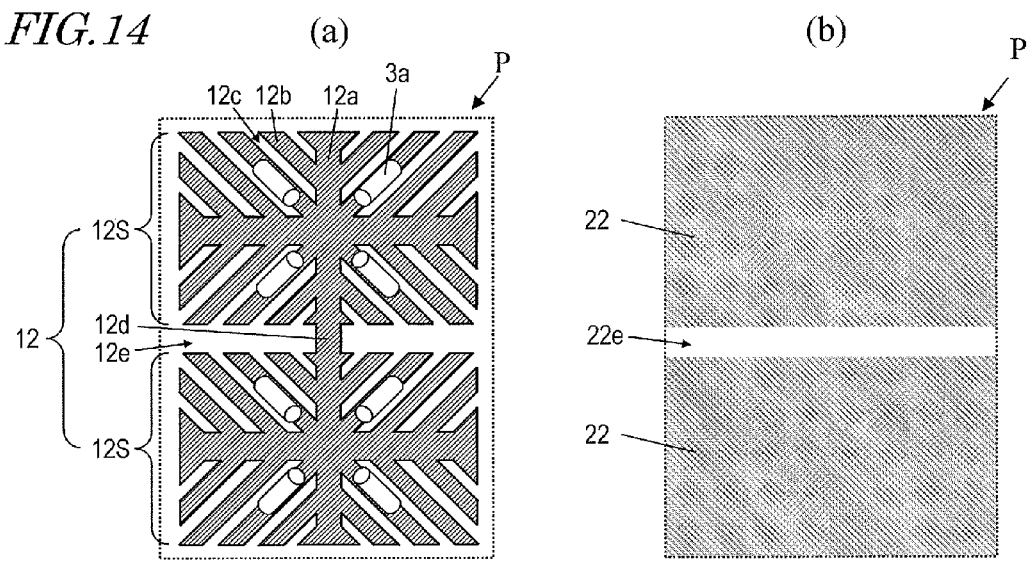
FIG. 14 Diagrams schematically showing electrode structures in one pixel P of the type 7 and type 8 liquid crystal display devices which include a fishbone structure pixel electrode 12. (a) is a plan view showing the electrode structure on the TFT substrate side. (b) is a plan view showing the electrode structure on the counter substrate side.

FIGS. 14(a) and 14(b) show the electrode structures in one pixel P of the type 7 and type 8 liquid crystal display devices. FIG. 14(a) is a plan view showing the electrode structure on the TFT substrate side. FIG. 14(b) is a plan view showing the electrode structure on the counter substrate side.

As shown in FIG. 14(a), on the TFT substrate side, the pixel electrode 12 which is the same as the pixel electrode 12 of the type 5 and type 6 liquid crystal display devices, i.e., the pixel electrode 12 that has the two sub-pixel electrodes 12S each of which has a fishbone structure, is provided.

As shown in FIG. 14(b), on the counter substrate side, two counter electrodes 22 which are electrically independent of each other are provided in each pixel P. The counter electrodes 22 are separated from each other by a slit 22e which has a width of 6 µm to 10 µm. On the counter electrode 22, the protrusions 25 such as those provided in the type 1 to type 4 liquid crystal display devices are not provided.

In the type 5 to type 8 liquid crystal display devices, in the presence of an applied voltage across the liquid crystal layer, the fishbone structure of the pixel electrode 12 enhances the liquid crystal molecules 3a to orient in the azimuth of 45°, the azimuth of 135°, the azimuth of 225°, and the azimuth of 315° as shown in FIG. 13(a) and FIG. 14(a). In the type 7 and type 8 liquid crystal display devices, the two counter electrodes 22 that are electrically independent of each other are provided in each pixel P. Thus, the multi-pixel driving can be realized by supplying different potentials to respective ones of the two counter electrodes 22.

TFT substrates and counter substrates which have the electrode structures shown in FIG. 11 to FIG. 14 were provided, and vertical alignment films were formed on the surfaces of respective substrates. Thereafter, a liquid crystal material of negative dielectric anisotropy was injected between the substrates, whereby a liquid crystal panel which includes a vertical alignment liquid crystal layer was prepared for each of type 1 to type 8. The liquid crystal material used had the refractive index anisotropy Δn of 0.1 and the dielectric anisotropy Δ∈ of −4.1. The thickness of the liquid crystal layer (cell gap), d, was 3.4 µm.

Each of the liquid crystal panels was provided with alignment sustaining layers which were formed by the PSA technology. Specifically, a 0.25 to 0.30 wt % acrylic photopolymerizable monomer was added to the liquid crystal material, and after fabrication of a liquid crystal panel, ultraviolet irradiation was performed with an applied voltage across the liquid crystal layer, whereby alignment sustaining layers (polymer layers) were formed over the surfaces of the vertical alignment films. With the alignment sustaining layers, the pretilt angle of the liquid crystal molecules 3a was defined to be 87° to 88° (2° to 3° with respect to the direction normal to the display surface).

Note that, herein, the liquid crystal panels were prepared for the purpose of evaluating the relationship between the transmission characteristic and the γ characteristic, and TFTs and wires were not actually formed on the TFT substrate. The pixel electrodes 14 or pixel electrodes 12 were electrically coupled with each other via an insulating film by a transparent wire which is formed in an underlying layer and which is made of a transparent conductive material (ITO or IZO). The pixel electrode 14 or pixel electrode 12 and the transparent wire are coupled at a contact hole which was formed in a region corresponding to the center of a certain one of the unit solid portions 14a or a certain one of the sub-pixel electrodes 12S. The counter substrate was not provided with a color filter (CF) or a black matrix (BM).

The liquid crystal panels for the type 1, type 3, type 5, and type 7 liquid crystal display devices were provided with the linear polarization plates 41a and 41b and the dual-axis phase plates 42a and 42b shown in FIG. 7(a), which were attached to the panels in the optical axis arrangement shown in FIG. 8(a). The liquid crystal panels for the type 2, type 4, type 6, and type 8 liquid crystal display devices were provided with the circular polarization plates 40a and 40b shown in FIG. 7(b), which were attached to the panels in the optical axis arrangement shown in FIG. 8(b). In this way, the type 1 and type 8 liquid crystal display devices were obtained.

FIGS. 15(a) to 15(d) illustrate the transmission characteristic of one pixel P in the type 1 to type 4 liquid crystal display devices. Table 2 shows the transmittance which was achieved in the presence of an applied voltage of 5 V across the liquid crystal layer in the type 1 to type 4 liquid crystal display devices. Table 2 also shows the relative ratio with respect to the transmittance of the type 2 liquid crystal display device which is assumed as 1.

TABLE 2

|  | Type | | | |
|---|---|---|---|---|
|  | 1 | 2 | 3 | 4 |
| Transmittance | 5.9% | 14.5% | 5.3% | 12.7% |
| Relative Ratio | 0.41 | 1.00 | 0.37 | 0.88 |

Figure 15:
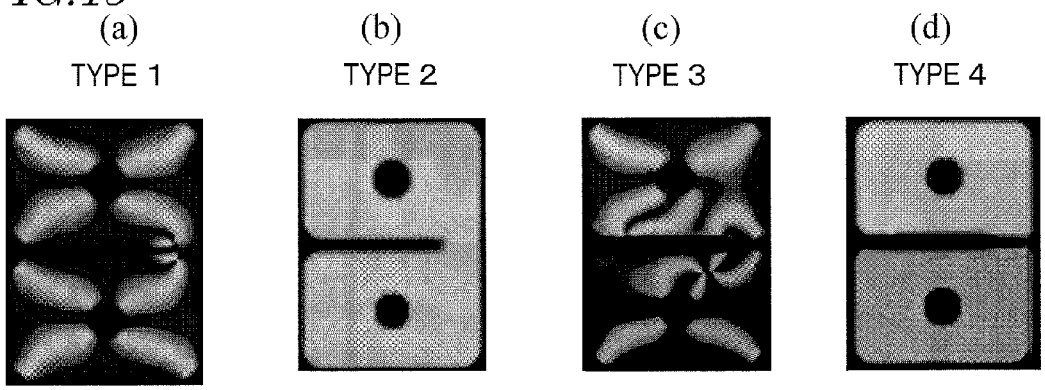
FIG. 15(*a*) to (*d*) are diagrams showing the transmission characteristics of one pixel P in the type 1 to type 4 liquid crystal display devices which perform display in the CPA mode.

In the type 1 liquid crystal display device, as shown in FIG. 15(a), only some portions of the region over the pixel electrode 14 are bright while the other portion is dark. This is because linearly-polarized light is incident on the liquid crystal layer in which the liquid crystal molecules 3a are oriented in all the azimuths so that, in portions where the liquid crystal molecules 3a are oriented in azimuths which form an angle of 45° with respect to the polarization direction of the incident light, the birefringence is the highest, and the transmittance is the largest.

On the other hand, in the type 2 liquid crystal display device, as shown in FIG. 15(b), the entire portion of the region over the pixel electrode 14 (although excluding portions overlapping the protrusions 25) is uniformly bright. This is because circularly-polarized light is incident on the liquid crystal layer so that the birefringence of liquid crystal molecules 3a for the incident light would not depend on the alignment azimuth.

As seen from Table 2, the type 1 liquid crystal display device exhibited the transmittance of 5.9% (relative ratio: 0.41), while the type 2 liquid crystal display device exhibited the transmittance of 14.5% (relative ratio: 1.00). That is, the transmittance which is achieved by the utilization of circularly-polarized light is 2.45 times the transmittance which is achieved when linearly-polarized light is utilized.

In the type 3 liquid crystal display device, only some portions of the region over the pixel electrode 14 are bright while the other portion is dark as shown in FIG. 15(c) for the same reason as that for the type 1 liquid crystal display device. On the other hand, in the type 4 liquid crystal display device, the entire portion of the region over the pixel electrode 14 (although excluding portions overlapping the protrusions 25) is uniformly bright as shown in FIG. 15(d) for the same reason as that for the type 2 liquid crystal display device.

As seen from Table 2, in the type 3 liquid crystal display device, the transmittance was 5.3% (relative ratio: 0.37), and in the type 4 liquid crystal display device, the transmittance was 12.7% (relative ratio: 0.88). That is, the transmittance which is achieved by the utilization of circularly-polarized light is 2.40 times the transmittance which is achieved when linearly-polarized light is utilized.

The type 4 liquid crystal display device utilizes circularly-polarized light as does the type 2 liquid crystal display device. However, the transmittance of the type 4 liquid crystal display device is 0.88 times the transmittance of the type 2 liquid crystal display device. This is because the multi-pixel driving is performed with a bright sub-pixel and a dark sub-pixel provided in the pixel P. In the type 4 liquid crystal display device, there is a potential difference of 1 V between the two counter electrodes 22 in the pixel P. A voltage of 5 V is applied across the liquid crystal layer overlying one of the counter electrodes 22 (the liquid crystal layer of the bright sub-pixel), while a voltage of 4 V is applied across the liquid crystal layer overlying the other counter electrode 22 (the liquid crystal layer of the dark sub-pixel).

FIGS. 16(a) to 16(d) illustrate the transmission characteristic of one pixel P in the type 5 to type 8 liquid crystal display devices. Table 3 shows the transmittance which was achieved in the presence of an applied voltage of 5 V across the liquid crystal layer in the type 5 to type 8 liquid crystal display devices. Table 3 also shows the relative ratio with respect to the transmittance of the type 6 liquid crystal display device which is assumed as 1.

TABLE 3

|  | Type | | | |
|---|---|---|---|---|
|  | 5 | 6 | 7 | 8 |
| Transmittance | 9.8% | 14.4% | 8.4% | 12.7% |
| Relative Ratio | 0.68 | 1.00 | 0.58 | 0.88 |

Figure 16:
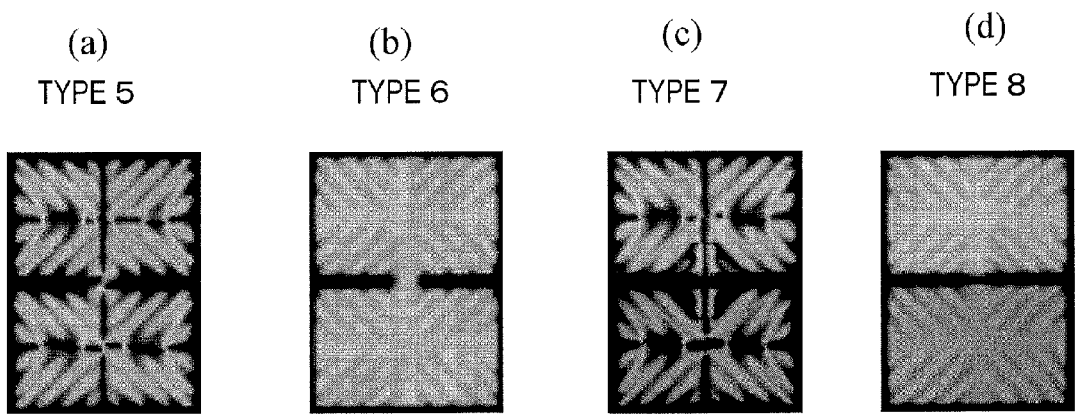
FIG. 16(*a*) to (*d*) are diagrams showing the transmission characteristics of one pixel P in the type 5 to type 8 liquid crystal display devices that include the fishbone structure pixel electrode 12.

The type 5 and type 7 liquid crystal display devices utilize linearly-polarized light but can perform brighter display than the type 1 and type 3 liquid crystal display devices as seen from FIGS. 16(a) and 16(c). This is because the liquid crystal molecules 3a are not oriented in all the azimuths but in specific azimuths (the azimuth of 45°, the azimuth of 135°, the azimuth of 225°, and the azimuth of 315°). However, as seen from FIGS. 16(a) and 16(c), regions extending over the slits 12c are darker than regions extending over the branch portions 12b. This is because the voltage which is applied across the liquid crystal overlying the slits 12c in which the conductive film is not present is lower than the voltage which is applied across the liquid crystal overlying the branch portions 12b. Further, there is a probability that a deviation occurs in the alignment azimuth of the liquid crystal molecules 3a overlying the slits 12c, and this may be one of the reasons that the region overlying the slits 12c is dark.

The type 6 and type 8 liquid crystal display devices utilize circularly-polarized light and therefore can perform bright display as seen from FIGS. 16(b) and 16(d). Also, as seen from FIGS. 16(b) and 16(d), regions overlying the slits 12c are darker than regions overlying the branch portions 12b. The degree of the darkness is smaller than in the type 5 and type 7 liquid crystal display devices (see FIGS. 16(a) and 16(c)). This is because circularly-polarized light is utilized, and therefore, the transmittance would not decrease even when a deviation occurs in the alignment azimuth of the liquid crystal molecules 3a overlying the slits 12c.

As seen from Table 3, the type 5 liquid crystal display device exhibited the transmittance of 9.8% (relative ratio: 0.68), while the type 6 liquid crystal display device exhibited the transmittance of 14.4% (relative ratio: 1.00). That is, the transmittance which is achieved by the utilization of circularly-polarized light is 1.47 times the transmittance which is achieved when linearly-polarized light is utilized.

As seen from Table 3, the type 7 liquid crystal display device exhibited the transmittance of 8.4% (relative ratio: 0.58), while the type 8 liquid crystal display device exhibited the transmittance of 12.7% (relative ratio: 0.88). That is, the transmittance which is achieved by the utilization of circularly-polarized light is 1.51 times the transmittance which is achieved when linearly-polarized light is utilized.

The type 8 liquid crystal display device utilizes circularly-polarized light as does the type 6 liquid crystal display device. However, the transmittance of the type 8 liquid crystal display device is 0.88 times the transmittance of the type 6 liquid crystal display device. This is because the multi-pixel driving is performed with a bright sub-pixel and a dark sub-pixel provided in the pixel P. In the type 8 liquid crystal display device, there is a potential difference of 1 V between the two counter electrodes 22 in the pixel P. A voltage of 5 V is applied across the liquid crystal layer overlying one of the counter electrodes 22 (the liquid crystal layer of the bright sub-pixel), while a voltage of 4 V is applied across the liquid crystal layer overlying the other counter electrode 22 (the liquid crystal layer of the dark sub-pixel).

Comparing the type 4 liquid crystal display device and the type 8 liquid crystal display device, it is appreciated that, when circularly-polarized light is utilized, there is substantially no difference in transmittance between the radial inclination alignment of the CPA mode and the four-domain alignment which is realized by the fishbone structure. This is because the transmittance loss which is attributed to the protrusions (rivets) 25 that are provided for stabilization of the alignment in the CPA mode is generally equal to the transmittance loss which is attributed to the fine slits 12c of the fishbone structure.

FIGS. 17(a) and 17(b) show the γ characteristic which is achieved when observed from the front direction (a direction normal to the display surface; the polar angle α=0°) and the γ characteristic which is achieved when observed from an oblique 60° direction (a direction which is defined by inclining the viewing angle from the front direction toward the right side, i.e., in the azimuth of 0°, such that the polar angle α=60°) for the type 1 to type 4 liquid crystal display devices that perform display in the CPA mode. FIG. 17(a) is a graph which shows the γ characteristics (grayscale-transmission intensity characteristics) of the type 1 and type 3 liquid crystal display devices that utilize linearly-polarized light. FIG. 17(b) is a graph which shows the γ characteristics of the type 2 and type 4 liquid crystal display devices that utilize circularly-polarized light.

It is appreciated from FIG. 17(a) that, in the type 1 and type 3 liquid crystal display devices, at middle grayscale levels, the transmission intensity for the oblique 60° direction is higher than the transmission intensity for the front direction. However, in the type 3 liquid crystal display device that performs the multi-pixel driving, the difference between the transmission intensity for the front direction and the transmission intensity for the oblique 60° direction is small, and the γ shift is reduced, as compared with the type 1 liquid crystal display device that does not perform the multi-pixel driving.

It is appreciated from FIG. 17(b) that, in the type 2 and type 4 liquid crystal display devices, at middle grayscale levels, the transmission intensity for the oblique 60° direction is higher than the transmission intensity for the front direction. However, in the type 4 liquid crystal display device that performs the multi-pixel driving, the difference between the transmission intensity for the front direction and the transmission intensity for the oblique 60° direction is small, and the γ shift is reduced, as compared with the type 2 liquid crystal display device that does not perform the multi-pixel driving.

It is also appreciated from the comparison of FIG. 17(a) and FIG. 17(b) that the γ shift is greater in the type 2 and type 4 liquid crystal display devices that utilize circularly-polarized light than in the type 1 and type 3 liquid crystal display devices that utilize linearly-polarized light. This is for the reasons described below.

The circular polarization plates 40a and 40b are designed so as to give a phase difference of λ/4 to light which is incident from the front direction. Therefore, the circular polarization plates 40a and 40b give a phase difference which is deviated from λ/4 to light which is incident from an oblique direction because of a longer optical path length. As a result, light which is incident on the liquid crystal panel from an oblique direction is not circularly-polarized light but elliptically-polarized light when it is incident on the liquid crystal layer. This elliptically-polarized light contains the 45° linear polarization component as previously described with reference to FIG. 10(b).

The birefringence of the liquid crystal molecules 3a is the highest when the liquid crystal molecules 3a are oriented in an azimuth which forms an angle of 45° with respect to the polarization direction of the incident light. Therefore, for the 45° linear polarization component of the elliptically-polarized light, liquid crystal molecules 3a which are oriented in the azimuth of 0°, the azimuth of 90°, the azimuth of 180°, and the azimuth of 270° exhibit the highest birefringence. Thus, in the radial inclination alignment that includes many liquid crystal molecules 3a which are oriented in the azimuth of 0°, the azimuth of 90°, the azimuth of 180°, and the azimuth of 270°, when circularly-polarized light is utilized, the difference between the phase difference that the liquid crystal layer gives light which is incident from the front direction and the phase difference that the liquid crystal layer gives light which is incident from an oblique direction is large, so that the γ shift is large.

For the above-described reasons, in the CPA-mode liquid crystal display devices, the γ shift is large when circularly-polarized light is utilized. Therefore, even when the multi-pixel driving is performed as in the type 4 liquid crystal display device, the γ shift is larger than in the case where linearly-polarized light is utilized and the multi-pixel driving is performed (i.e., the type 3 liquid crystal display device).

Figure 18:
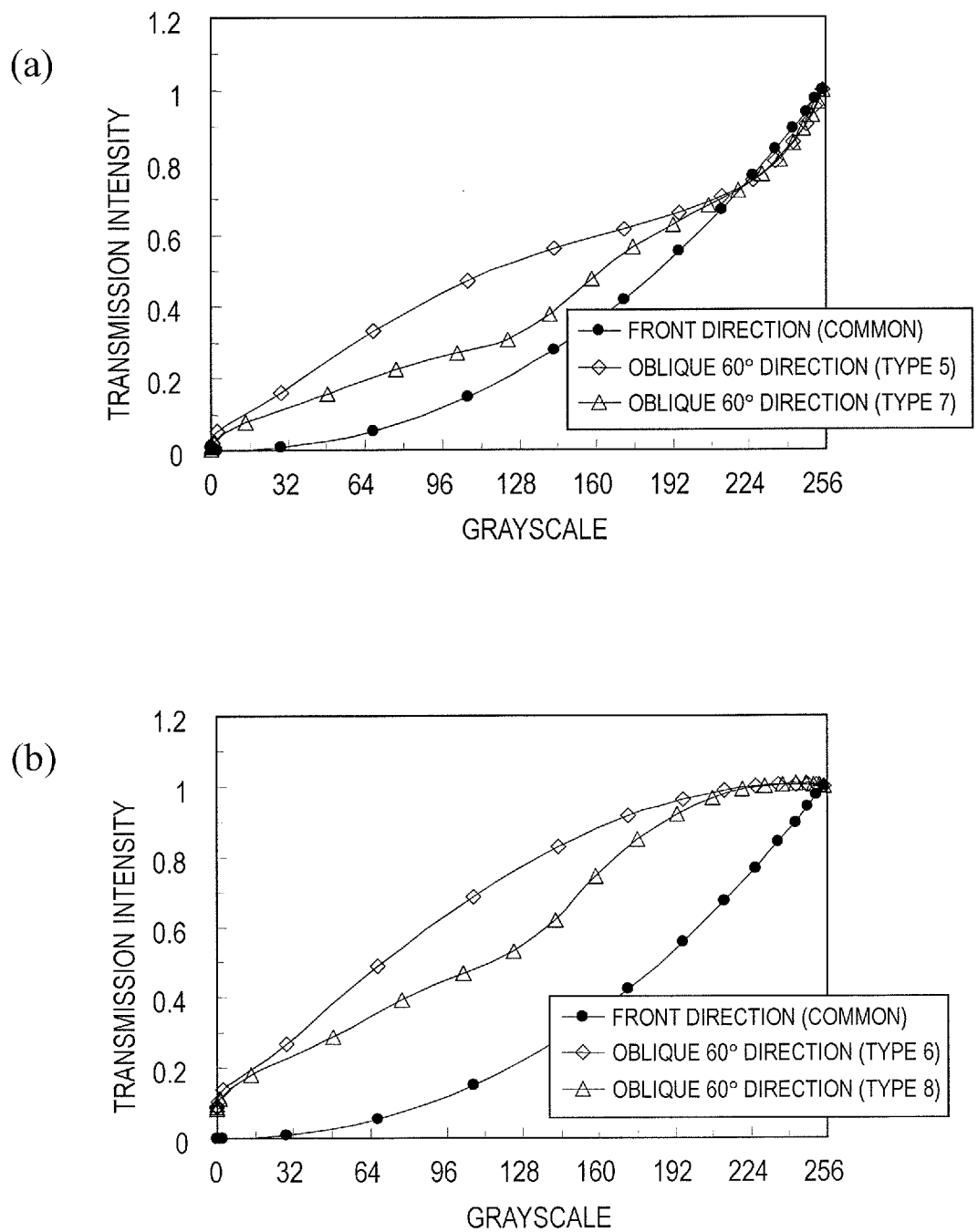
FIG. 18 Graphs showing the γ characteristic which is achieved when observed from the front viewing direction and the γ characteristic which is achieved when observed from a diagonal 60° direction in the type 5 to type 8 liquid crystal display devices that include the fishbone structure pixel electrode 12. (a) shows the γ characteristics of the type 5 and type 7 liquid crystal display devices which utilize linearly-polarized light. (b) shows the γ characteristics of the type 6 and type 8 liquid crystal display devices which utilize circularly-polarized light.

FIGS. 18(a) and 18(b) show the γ characteristic which is achieved when observed from the front direction and the γ characteristic which is achieved when observed from an oblique 60° direction for the type 5 to type 8 liquid crystal display devices that include the fishbone structure pixel electrode 12. FIG. 18(a) is a graph which shows the γ characteristics (grayscale-transmission intensity characteristics) of the type 5 and type 7 liquid crystal display devices that utilize linearly-polarized light. FIG. 18(b) is a graph which shows the γ characteristics of the type 6 and type 8 liquid crystal display devices that utilize circularly-polarized light.

It is appreciated from FIG. 18(a) that, in the type 5 and type 7 liquid crystal display devices, at middle grayscale levels, the transmission intensity for the oblique 60° direction is higher than the transmission intensity for the front direction. However, in the type 7 liquid crystal display device that performs the multi-pixel driving, the difference between the transmission intensity for the front direction and the transmission intensity for the oblique 60° direction is small, and the γ shift is reduced, as compared with the type 5 liquid crystal display device that does not perform the multi-pixel driving.

It is appreciated from FIG. 18(b) that, in the type and type 8 liquid crystal display devices, at middle grayscale levels, the transmission intensity for the oblique 60° direction is higher than the transmission intensity for the front direction. However, in the type 8 liquid crystal display device that performs the multi-pixel driving, the difference between the transmission intensity for the front direction and the transmission intensity for the oblique 60° direction is small, and the γ shift is reduced, as compared with the type 6 liquid crystal display device that does not perform the multi-pixel driving.

It is also appreciated from the comparison of FIG. 17(b) and FIG. 18(b) that, although the type 4 liquid crystal display device and the type 8 liquid crystal display device are common with each other in that circularly-polarized light is utilized and the multi-pixel driving is performed, the γ shift is smaller in the type 8 liquid crystal display device that includes the fishbone structure pixel electrode 12 than in the type 4 liquid crystal display device that performs display in the CPA mode.

It is appreciated from the comparison of FIG. 18(a) with FIGS. 17(a) and 17(b) and FIG. 18(b) that the γ shift of the type 7 liquid crystal display device is the smallest, and just from the viewpoint of reducing the γ shift, the type 7 liquid crystal display device is the most preferred. However, in the type 7 liquid crystal display device, the decrease of the transmittance is large (see Table 2 and Table 3). Specifically, the transmittance of the type 7 liquid crystal display device is 0.58 times the transmittance of the type 2 liquid crystal display device that exhibits the highest transmittance. This means that the transmittance decreases by 42%. On the other hand, in the type 8 liquid crystal display device, the decrease of the transmittance is small. Specifically, the transmittance of the type 8 liquid crystal display device is 0.88 times the transmittance of the type 2 liquid crystal display device. This means that the decrease of the transmittance is only 12%. Also, in the type 8 liquid crystal display device, the γ shift does not have a projecting portion at middle grayscale levels although the γ shift is somewhat larger than that of the type 7 liquid crystal display device. Thus, the γ shift is at such a level that it does not matter in practical use.

As described above, the type 8 liquid crystal display device, i.e., the liquid crystal display device 100 of the present embodiment, is excellent in terms of both reduction of the γ shift and prevention of the decrease of the transmittance. This is the effect which is achieved by using "the configuration which utilizes circularly-polarized light", "the pixel electrode which has the fishbone structure", and "the counter division driving" in combination in the liquid crystal display device 100 of the present embodiment.

Note that the above combination includes a combination of "the configuration which utilizes circularly-polarized light" and "the pixel electrode which has the fishbone structure", which is quite uncommon in the conventional techniques. The pixel electrode which has the fishbone structure is provided for the purpose of orienting the liquid crystal molecules in particular azimuths, specifically in azimuths which are parallel to the slits (parallel to the branch portions) and is therefore commonly used in combination with the configuration which utilizes linearly-polarized light. The configuration which utilizes circularly-polarized light is provided for the purpose of improving the transmittance and is therefore commonly used in combination with a pixel electrode which does not have a slit in an alignment region except for a slit that is provided for dividing a pixel into a plurality of sub-pixels (e.g., the pixel electrode 14 such as shown in FIG. 11(a) or FIG. 12(a), which is referred to as "undivided electrode"). In the fishbone structure pixel electrode, only an oblique electric field affects the slits extending between the branch portions, so that an electric field loss (decrease of voltage) occurs. When the aperture ratio is equal, the transmittance decreases as compared with the undivided electrode.

However, the combination of the configuration which utilizes circularly-polarized light and the undivided electrode is excellent in terms of transmittance but cannot sufficiently reduce the γ shift even when the counter division driving technique is employed (the above-described type 4 liquid crystal display device). Also, the combination of the configuration which utilizes linearly-polarized light and the fishbone structure pixel electrode can sufficiently reduce the γ shift by the use of the counter division driving technique but lowers the transmittance due to the electric field loss, resulting in somewhat dark display (the above-described type 7 liquid crystal display device). Thus, to realize both reduction of the γ shift and prevention of the decrease of the transmittance, the combination of "the configuration which utilizes circularly-polarized light", "the pixel electrode which has the fishbone structure", and "the counter division driving" is the best combination. If any of these elements is absent, the display characteristics will deteriorate. The fishbone structure pixel electrode and the counter division driving technique enable sufficient reduction of the γ shift, and the decrease of the transmittance which is caused by the electric field loss that is attributed to the fishbone structure can be compensated for by the utilization of circularly-polarized light. Also, the counter division driving technique compensates for the increase of the γ shift which is caused by the utilization of circularly-polarized light. Thus, "the configuration which utilizes circularly-polarized light", "the pixel electrode which has the fishbone structure", and "the counter division driving" perform the roles which are complementary to one another, thereby achieving the effects of the invention of the present application.

Figure 19:
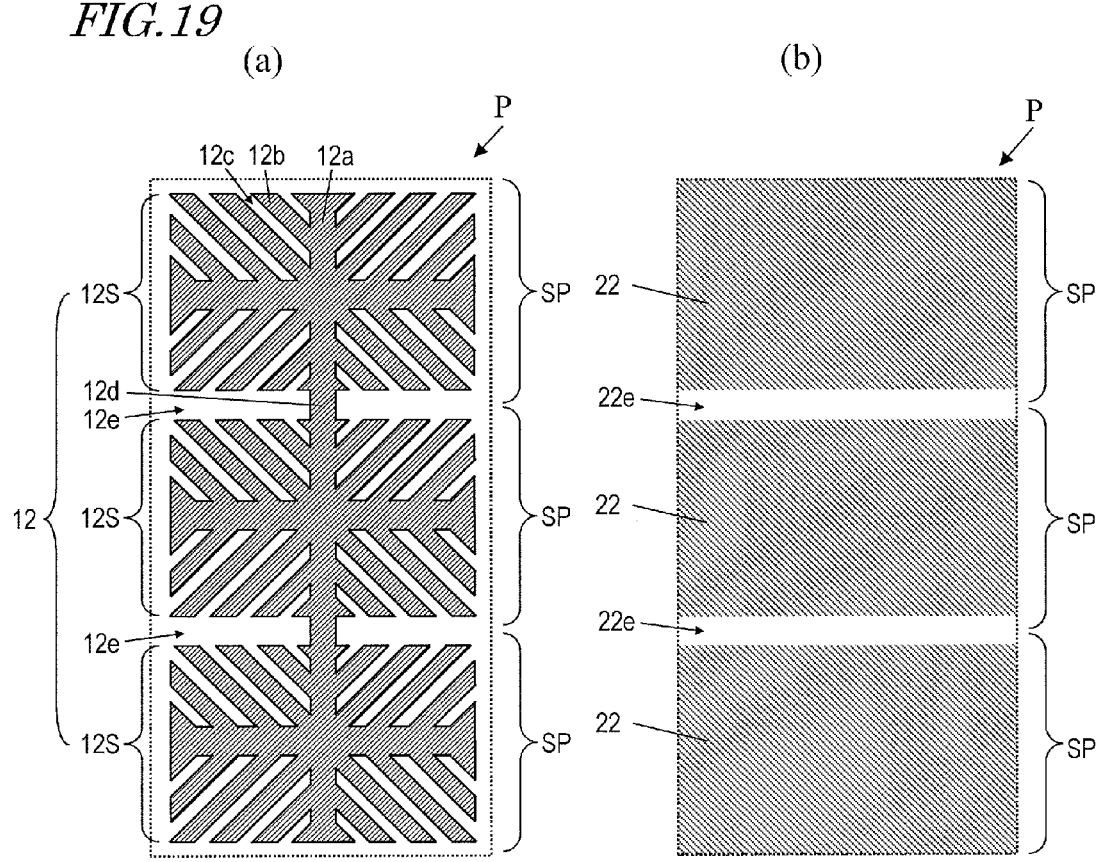
FIG. 19 Diagrams showing electrode structures in a case where one pixel P of the liquid crystal display device 100 includes three sub-pixels SP. (a) is a plan view showing the electrode structure on the TFT substrate side. (b) is a plan view showing the electrode structure on the counter substrate side.

In the present embodiment, the present invention has been described with an example where one pixel P includes two sub-pixels SP, although the present invention is not limited to this example. One pixel P may include three or more sub-pixels SP. FIGS. 19(a) and 19(b) show the electrode structures in a pixel P which includes three sub-pixels SP. FIG. 19(a) is a plan view showing the electrode structure on the TFT substrate side. FIG. 19(b) is a plan view showing the electrode structure on the counter substrate side.

When the pixel P includes three sub-pixels SP, a pixel electrode 12 which includes three sub-pixel electrodes 12S is provided on the TFT substrate side as shown in FIG. 19(a). Each of the three sub-pixel electrodes 12S includes a cruciform trunk portion 12a, a plurality of branch portions 12b extending from the trunk portion 12a in the directions of about 45°, and a plurality of slits 12c provided between the plurality of branch portions 12b. That is, each of the sub-pixel electrodes 12S has a fishbone structure. On the other hand, on the counter substrate side, three counter electrodes which are electrically independent of each other are provided in each pixel P as shown in FIG. 19(b).

The configuration in which one pixel P includes three or more sub-pixels SP also enables sufficient reduction of the γ shift and prevention of the decrease of the transmittance as in the case where one pixel P includes two sub-pixels SP. Thus, display in which the viewing angle dependence of the γ characteristic is small and which is bright can be realized.

INDUSTRIAL APPLICABILITY

The present invention is suitably used in a liquid crystal display device which includes a vertical alignment liquid crystal layer. A liquid crystal display device of the present invention is suitably used as a display section of various electronic devices, including mobile phones, PDAs, notebook PCs, monitors, and television receivers.

REFERENCE SIGNS LIST 1 active matrix substrate (TFT substrate)
2 counter substrate (color filter substrate)
3 liquid crystal layer 3a liquid crystal molecules
11, 21 transparent substrate
12 pixel electrode
12S sub-pixel electrode
12a trunk portion
12a1 horizontal linear portion of trunk portion
12a2 vertical linear portion of trunk portion
12b branch portion
12b1 first group branch portion
12b2 second group branch portion
12b3 third group branch portion
12b4 fourth group branch portion
12c slit
12d connecting portion
12e slit
22 counter electrode
22e slit
32a, 32b vertical alignment film
34a, 34b alignment sustaining layer
40a, 40b circular polarization plate
40a1, 40b1 linear polarizer
40a2, 40b2 ¼-wave plate
50 thin film transistor (TFT)
51 scan line
52 signal line
100 liquid crystal display device
P pixel
SP sub-pixel

The invention claimed is:

1. A liquid crystal display device having a plurality of pixels which are in a matrix arrangement, comprising:
a first substrate which includes a pixel electrode which is provided in each of the plurality of pixels;
a second substrate which opposes the first substrate; and
a vertical alignment liquid crystal layer which is provided between the first substrate and the second substrate,
wherein light that is incident on the liquid crystal layer is circularly-polarized light, and the liquid crystal layer modulates the circularly-polarized light, thereby realizing display,
the pixel electrode includes at least one cruciform trunk portion, a plurality of branch portions extending from the at least one cruciform trunk portion in a direction of about 45°, and a plurality of slits provided between the plurality of branch portions, and
the second substrate includes a plurality of counter electrodes which are electrically independent of each other in each of the plurality of pixels, so that in each pixel the second substrate comprises a plurality of counter electrodes corresponding to the pixel electrode in the corresponding pixel;
wherein
when a voltage is applied across the liquid crystal layer, four types of liquid crystal domains are formed in the liquid crystal layer in each of the plurality of pixels,
azimuths of four directors that are representative of orientations of liquid crystal molecules that are included in respective ones of the four types of liquid crystal domains are different from one another,
each of the azimuths of the four directors is generally parallel to any of the plurality of branch portions,
the at least one cruciform trunk portion includes a plurality of cruciform trunk portions,
the pixel electrode includes a plurality of sub-pixel electrodes each of which includes any one of the plurality of cruciform trunk portions,
when a voltage is applied across the liquid crystal layer, the four types of liquid crystal domains are formed in each of a plurality of sub-pixels which are defined by the plurality of sub-pixel electrodes,
the plurality of sub-pixel electrodes are provided so as to correspond to the plurality of counter electrodes on a one-to-one basis, and
a boundary of adjacent sub-pixel electrodes overlaps a boundary of adjacent counter electrodes.

2. The liquid crystal display device of claim 1 wherein, when at least part of middle grayscale levels are displayed, the plurality of counter electrodes are supplied with different potentials.

3. The liquid crystal display device of claim 2, wherein the four types of liquid crystal domains include a first liquid crystal domain in which the azimuth of the director is a first azimuth, a second liquid crystal domain in which the azimuth of the director is a second azimuth, a third liquid crystal domain in which the azimuth of the director is a third azimuth, and a fourth liquid crystal domain in which the azimuth of the director is a fourth azimuth, and a difference between any two of the first azimuth, the second azimuth, the third azimuth, and the fourth azimuth is generally equal to an integral multiple of 90°, and azimuths of directors of liquid crystal domains which are adjacent to each other via the trunk portion are different by about 90°.

4. The liquid crystal display device of claim 1, further comprising:
a pair of vertical alignment films which are provided between the pixel electrode and the liquid crystal layer and between the plurality of counter electrodes and the liquid crystal layer; and
a pair of alignment sustaining layers which are provided on surfaces of the pair of vertical alignment films which are closer to the liquid crystal layer and which are made of a photopolymerized material.

5. The liquid crystal display device of claim 1, further comprising a pair of circular polarization plates which oppose each other via the liquid crystal layer.

* * * * *